United States Patent
Huang et al.

(10) Patent No.: US 11,063,709 B2
(45) Date of Patent: Jul. 13, 2021

(54) SEGMENT RETRANSMISSION METHOD AND APPARATUS

(71) Applicant: HUAWEI TECHNOLOGIES CO., LTD., Guangdong (CN)

(72) Inventors: Qufang Huang, Shanghai (CN); Xing Liu, Shenzhen (CN); Qinghai Zeng, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 8 days.

(21) Appl. No.: 16/502,527

(22) Filed: Jul. 3, 2019

(65) Prior Publication Data
US 2019/0327033 A1    Oct. 24, 2019

Related U.S. Application Data

(63) Continuation of application No. PCT/CN2017/120275, filed on Dec. 29, 2017.

(30) Foreign Application Priority Data

Jan. 5, 2017    (CN) .................. 201710008201.X

(51) Int. Cl.
*H04L 1/18*    (2006.01)
*H04W 84/04*    (2009.01)

(52) U.S. Cl.
CPC ......... *H04L 1/1848* (2013.01); *H04W 84/042* (2013.01)

(58) Field of Classification Search
CPC . H04L 1/16; H04L 1/18; H04L 1/1848; H04L 1/1803; H04L 1/809; H04L 1/1835; H04L 1/188; H04W 84/042
See application file for complete search history.

(56) References Cited

U.S. PATENT DOCUMENTS

2009/0327830 A1    12/2009    Lee et al.
2011/0019756 A1*    1/2011    Chun .................... H04L 1/188
                                                              375/260

(Continued)

FOREIGN PATENT DOCUMENTS

CN    101478380 A    7/2009
CN    102957522 A    3/2013

(Continued)

OTHER PUBLICATIONS

3GPP TS 36.322 V8.0.0 (Dec. 2007),3rd Generation Partnership Project;Technical Specification Group Radio Access Network;Evolved Universal Terrestrial Radio Access (E-UTRA)Radio Link Control (RLC) protocol specification(Release 8),total 35 pages.

*Primary Examiner* — Kent Krueger
(74) *Attorney, Agent, or Firm* — Womble Bond Dickinson (US) LLP

(57) ABSTRACT

A segment retransmission method includes: if a receiving RLC function entity has not received, within a preset time period, all segments of a data packet identified by a serial number, the receiving RLC function entity sends a retransmission request to a sending party, where the retransmission request includes the serial number, to request the sending party to retransmit an unreceived segment of the data packet identified by the serial number, and thus reduces an average data packet transmission latency.

19 Claims, 21 Drawing Sheets

(56) References Cited

U.S. PATENT DOCUMENTS

| | | | |
|---|---|---|---|
| 2013/0194933 A1* | 8/2013 | Celik | H04L 1/1685 370/242 |
| 2015/0237621 A1* | 8/2015 | Zhu | H04W 72/0426 370/329 |
| 2016/0050611 A1* | 2/2016 | Wang | H04W 40/04 370/328 |
| 2017/0156145 A1* | 6/2017 | Marinier | H04W 72/044 |
| 2019/0306871 A1* | 10/2019 | Liu | H04W 80/02 |

FOREIGN PATENT DOCUMENTS

| | | | |
|---|---|---|---|
| CN | 103944684 | A | 7/2014 |
| EP | 1230757 | B1 | 8/2007 |
| WO | 2010021465 | A2 | 2/2010 |
| WO | 2011019427 | A2 | 2/2011 |

\* cited by examiner

SEGMENT RETRANSMISSION METHOD AND APPARATUS

CROSS-REFERENCE TO RELATED APPLICATIONS

This application is a continuation of International Application No. PCT/CN2017/120275, filed on Dec. 29, 2017, which claims priority to Chinese Patent Application No. 201710008201.X, filed on Jan. 5, 2017, the disclosures of the aforementioned applications are hereby incorporated by reference in their entireties.

TECHNICAL FIELD

The disclosure relates to communications technologies, and in particular, to a segment retransmission method and apparatus.

BACKGROUND

In a wireless communications technology, to support a higher service rate and a shorter processing latency, user-plane functions are improved based on a long term evolution (LTE) system.

In the prior art, a concatenation function at a radio link control RLC) layer is cancelled, and no RLC serial numbers (SN) are allocated at the RLC layer. That is, at the RLC layer, only segmentation is performed, and concatenation is not performed. In addition, serial numbers allocated at a packet data convergence protocol (PDCP) layer are reused at the RLC layer.

However, retransmitting a data packet at the PDCP layer by using the prior-art method causes a long data packet transmission latency.

SUMMARY

The disclosure provides a segment retransmission method and apparatus, to implement segment retransmission and reduce a data packet transmission latency.

A first aspect of the disclosure provides a segment retransmission method, including: if a receiving radio link control function entity has not received, within a preset time period, all segments of a data packet identified by a first serial number, sending, by the receiving radio link control function entity, a retransmission request to a sending party, where the retransmission request includes the first serial number, to request the sending party to retransmit an unreceived segment of the data packet identified by the first serial number. This implements segment retransmission triggered by the receiving RLC function entity, avoids data packet retransmission of a receiving PDCP function entity, and reduces an average data packet transmission latency.

In one embodiment, before the sending, by the receiving radio link control function entity, a retransmission request to a sending party, the method further includes:

starting, by the receiving radio link control function entity, a first timer after receiving a first radio link control (RLC) protocol data unit (PDU) in the data packet identified by the first serial number, where timing duration of the first timer is the preset time period; and if the first timer expires, determining, by the receiving radio link control function entity, that not all the segments of the data packet identified by the first serial number are received.

In one embodiment, before the starting, by the receiving radio link control function entity, a first timer after receiving a first segment of the data packet identified by the first serial number, the method further includes:

determining, by the receiving radio link control function entity, that the received first RLC PDU is the first segment of the data packet identified by the first serial number.

In one embodiment, the determining, by the receiving radio link control function entity, that the received first RLC PDU is the first segment of the data packet identified by the first serial number includes:

receiving, by the receiving radio link control function entity, the first RLC PDU, and obtaining the first serial number of the first RLC PDU; and determining, by the receiving radio link control function entity based on the first serial number of the first RLC PDU, whether a segment having the same first serial number exists in a cache, and if no segment having the same first serial number exists, determining that the first RLC PDU is the first segment corresponding to the first serial number.

In one embodiment, the method further includes:

if determining that a segment having the same first serial number exists, determining, by the receiving radio link control function entity, whether all the segments of the data packet identified by the first serial number of the first RLC PDU are received; and if determining that not all the segments of the data packet identified by the first serial number are received, storing, by the receiving radio link control function entity, the first RLC PDU into the cache.

In one embodiment, the method further includes:

if determining that all the segments of the data packet identified by the first serial number are received, delivering, by the receiving radio link control function entity to a receiving packet data convergence protocol function entity, the data packet identified by the first serial number.

In one embodiment, the obtaining the first serial number of the first RLC PDU includes:

obtaining, by the receiving radio link control function entity, the first serial number from a header of the first RLC PDU, where the header of the first RLC PDU includes the first serial number; or receiving, by the receiving radio link control function entity, a notification message from a receiving media access control function entity, where the notification message includes the first serial number.

In one embodiment, the receiving, by the receiving radio link control function entity, a notification message from a receiving media access control function entity includes:

reading, by the receiving media access control function entity, a first serial number in a header of a MAC SDU corresponding to the first RLC PDU, and sending the first serial number to the receiving radio link control function entity by using the notification message; or determining, by the receiving media access control function entity based on a known serial number of a MAC SDU in a received transport block, a first serial number of a MAC SDU corresponding to the first RLC PDU, and sending the first serial number to the receiving radio link control function entity by using the notification message.

In one embodiment, the method further includes:

determining, by the receiving radio link control function entity, that a type of the first RLC PDU is a segment.

In one embodiment, the determining, by the receiving radio link control function entity, that a type of the first RLC PDU is a segment includes:

determining, by the receiving radio link control function entity based on content in the header of the first RLC PDU, that the type of the first RLC PDU is the segment; or determining, by the receiving radio link control function entity based on content in a header of a media access control service data unit MAC SDU corresponding to the first RLC PDU of a receiving party, that the type of the first RLC PDU is the segment.

In one embodiment, the header of the first RLC PDU includes a serial number, or the header of the first RLC PDU includes a serial number and an SO; and the determining, by the receiving radio link control function entity based on content in the header of the first RLC PDU, that the type of the first RLC PDU is the segment includes:

if the header of the first RLC PDU includes the serial number and the SO, determining that the type of the first RLC PDU is the segment.

In one embodiment, the header of the first RLC PDU includes an FI, and the FI is represented by two bits, where a first bit indicates whether a start location of the first RLC PDU is a start location of the data packet to which the first RLC PDU belongs, and a second bit indicates whether an end location of the first RLC PDU is an end location of the data packet to which the first RLC PDU belongs; and the determining, by the receiving radio link control function entity based on content in the header of the first RLC PDU, that the type of the first RLC PDU is the segment includes:

if the first bit of the FI in the header of the first RLC PDU indicates that start location of the first RLC PDU is not the start location of the data packet to which the first RLC PDU belongs, or the second bit of the FI indicates that end location of the first RLC PDU is not the end location of the data packet to which the first RLC PDU belongs, determining that the type of the first RLC PDU is the segment.

In one embodiment, the method further includes:

determining, by the receiving radio link control function entity, that a type of the first RLC PDU is a data packet; and determining, by the receiving media access control function entity, whether a segment corresponding to the data packet exists in the cache, and if a segment corresponding to the data packet exists, deleting the segment corresponding to the data packet.

In one embodiment, the retransmission request includes the first serial number and an identifier of the unreceived segment of the data packet identified by the first serial number.

In one embodiment, the retransmission request further includes a second serial number and an identifier of an unreceived segment of a data packet identified by the second serial number.

In one embodiment, the identifier of the segment includes a start location of the segment and an offset of the segment.

In one embodiment, the retransmission request includes receiving status information of at least one data packet;

the at least one data packet includes the data packet corresponding to the first timer; and receiving status information of each data packet includes:
a serial number of a data packet corresponding to all segments that have been received; or
a serial number of a data packet corresponding to any segment that is not received; or
a serial number of a data packet corresponding to some segments that are received, and identifiers of the some segments, where the identifiers of the some segments include start locations of the segments and offsets of the segments; or a serial number of a data packet corresponding to some segments that are not received, and identifiers of the some segments that are not received, where the identifiers of the some segments include start locations of the segments and offsets of the segments.

A second aspect of the disclosure provides a segment retransmission method, including: starting, by a sending radio link control function entity after segmenting a data packet, a first timer corresponding to the data packet; and if receiving a retransmission request from a receiving radio link control function entity before the first timer expires, performing retransmission according to the retransmission request. That is, the sending radio link control function entity proactively retransmits the data packet. In this way, a data packet transmission speed is increased, and a data packet transmission latency is shortened.

In one embodiment, the method further includes:

if the first timer expires, retransmitting, by the sending radio link control function entity, the data packet corresponding to the first timer.

In one embodiment, the method further includes:

if receiving, from the receiving radio link control function entity, a notification that the data packet corresponding to the first timer has been received or all segments of the data packet have been received, stopping, by the sending radio link control function entity, the first timer; or if receiving, from a receiving packet data convergence protocol function entity, a notification that the data packet corresponding to the first timer has been received, stopping, by the sending radio link control function entity, the first timer; or if receiving, from a sending packet data convergence protocol function entity, a notification that the data packet corresponding to the first timer has been received, stopping, by the sending radio link control function entity, the first timer; or if acknowledgements (ACKs) are received for all hybrid automatic repeat request (HARQ) processes used for sending all segments of the data packet corresponding to the first timer, stopping the first timer.

In one embodiment, the method further includes:

if the first timer expires, sending, by the sending radio link control function entity, a status report reporting request to the receiving radio link control function entity, where the status report reporting request includes a serial number of the data packet corresponding to the first timer;

receiving, by the sending radio link control function entity, a radio link control (RLC) status report sent by the receiving radio link control function entity; and retransmitting, by the sending radio link control function entity based on the RLC status report, the data packet or a segment corresponding to the first timer.

In one embodiment, the RLC status report includes receiving status information of at least one data packet;

the at least one data packet includes the data packet corresponding to the first timer; and receiving status information of each data packet includes:
a serial number of a data packet corresponding to all segments that have been received; or
a serial number of a data packet corresponding to any segment that is not received; or
a serial number of a data packet corresponding to some segments that are received, and identifiers of the some segments, where the identifiers of the some segments include start locations of the segments and offsets of the segments; or a serial number of a data packet corresponding to some segments that are not received, and identifiers of the some segments that are not received, where the identifiers of the some segments include start locations of the segments and offsets of the segments.

A third aspect of the disclosure provides a segment retransmission apparatus, including:

a receiver and a transmitter, where the receiver is configured to receive segments of a data packet identified by a first serial number; and the transmitter is configured to: if the receiver has not received, within a preset time period, all the segments of the data packet identified by the first serial number, send a retransmission request to a sending party, where the retransmission request includes the first serial number, and the retransmission request is used to request to retransmit an unreceived segment of the data packet identified by the first serial number.

In one embodiment, the apparatus further includes:

a processor, configured to: start a first timer after the receiver receives a first radio link control (RLC) protocol data unit (PDU) in the data packet identified by the first serial number, where timing duration of the first timer is the preset time period; and if the first timer expires, determine that not all the segments of the data packet identified by the first serial number are received.

In one embodiment, the processor is further configured to determine that the received first RLC PDU is the first segment of the data packet identified by the first serial number.

In one embodiment, the processor is specifically configured to: obtain the first serial number of the first RLC PDU after the receiver receives the first RLC PDU; and determine, based on the first serial number of the first RLC PDU, whether a segment having the same first serial number exists in a cache, and if no segment having the same first serial number exists, determine that the first RLC PDU is the first segment corresponding to the first serial number.

In one embodiment, the processor is specifically configured to obtain the first serial number from a header of the first RLC PDU, where the header of the first RLC PDU includes the first serial number; or the receiver receives a notification message from a receiving media access control function entity, where the notification message includes the first serial number.

In one embodiment, the processor is further configured to determine that a type of the first RLC PDU is a segment.

In one embodiment, the processor is specifically configured to determine, based on content in the header of the first RLC PDU, that the type of the first RLC PDU is the segment; or the processor is specifically configured to determine, based on content in a header of a media access control service data unit MAC SDU corresponding to the first RLC PDU of a receiving party, that the type of the first RLC PDU is the segment.

In one embodiment, the header of the first RLC PDU includes a serial number, or the header of the first RLC PDU includes a serial number and a segment offset (SO); and the processor is specifically configured to: if the header of the first RLC PDU includes the serial number and the SO, determine that the type of the first RLC PDU is the segment.

In one embodiment, the processor is further configured to: determine that a type of the first RLC PDU is a data packet; and determine whether a segment corresponding to the data packet exists in the cache, and if a segment corresponding to the data packet exists, delete the segment corresponding to the data packet.

A fourth aspect of the disclosure provides a segment retransmission apparatus, including:

a processor, a receiver, and a transmitter, where the processor is configured to: after segmenting a data packet, start a first timer corresponding to the data packet;

the receiver receives a retransmission request from a receiving radio link control function entity; and the transmitter is configured to: if the receiver receives the retransmission request from the receiving radio link control function entity before the first timer expires, perform retransmission according to the retransmission request.

In one embodiment, the transmitter is further configured to: if the first timer expires, retransmit the data packet corresponding to the first timer.

In one embodiment, the processor is further configured to: if the receiver receives, from the receiving radio link control function entity, a notification that the data packet corresponding to the first timer has been received or all segments of the data packet have been received, stop the first timer; or the processor is further configured to: if the receiver receives, from a receiving packet data convergence protocol function entity, a notification that the data packet corresponding to the first timer has been received, stop the first timer; or the processor is further configured to: if the receiver receives, from a sending packet data convergence protocol function entity, a notification that the data packet corresponding to the first timer has been received, stop the first timer; or the processor is further configured to: if the receiver receives ACKs corresponding to HARQ processes used for sending all segments of the data packet corresponding to the first timer, stop the first timer.

In one embodiment, the transmitter is further configured to: if the first timer expires, send a status report reporting request to the receiving radio link control function entity, where the status report reporting request includes a serial number of the data packet corresponding to the first timer;

the receiver is further configured to receive a radio link control (RLC) status report sent by the receiving radio link control function entity; and the processor is further configured to control, based on the RLC status report, the transmitter to retransmit the data packet or a segment corresponding to the first timer.

DESCRIPTION OF EMBODIMENTS

In the specification, claims, and accompanying drawings of the disclosure, the terms "first", "second", "third", "fourth", and so on (if existent) are intended to distinguish between similar objects but do not necessarily indicate a specific order or sequence. It should be understood that the data termed in such a way is interchangeable in proper circumstances, so that the disclosure described herein can be implemented in an order other than the order illustrated or described herein. In addition, the terms "including", "having", and any variants thereof are intended to cover non-exclusive inclusion, for example, a process, method, system, product, or device that includes a list of operations or units is not necessarily limited to those operations or units, but may include other operations or units that are not expressly listed or that are inherent to such a process, method, system, product, or device.

The disclosure may be applied to a 5G communications system or a communications system after 5G Provided that resources need to be allocated by either of two communication parties, the solutions of the disclosure can be applied.

A 5G system is used as an example for description in the disclosure. Implementation principles and technical effects of other systems are similar, and are not described in detail.

Figure 1:
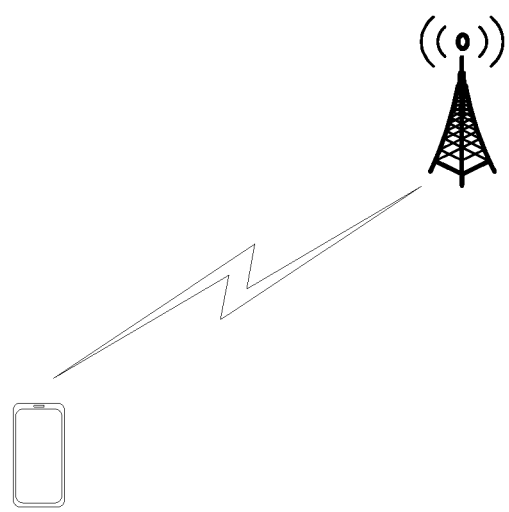
FIG. 1 is a schematic diagram of a communications system according to the disclosure.
Figure 2:
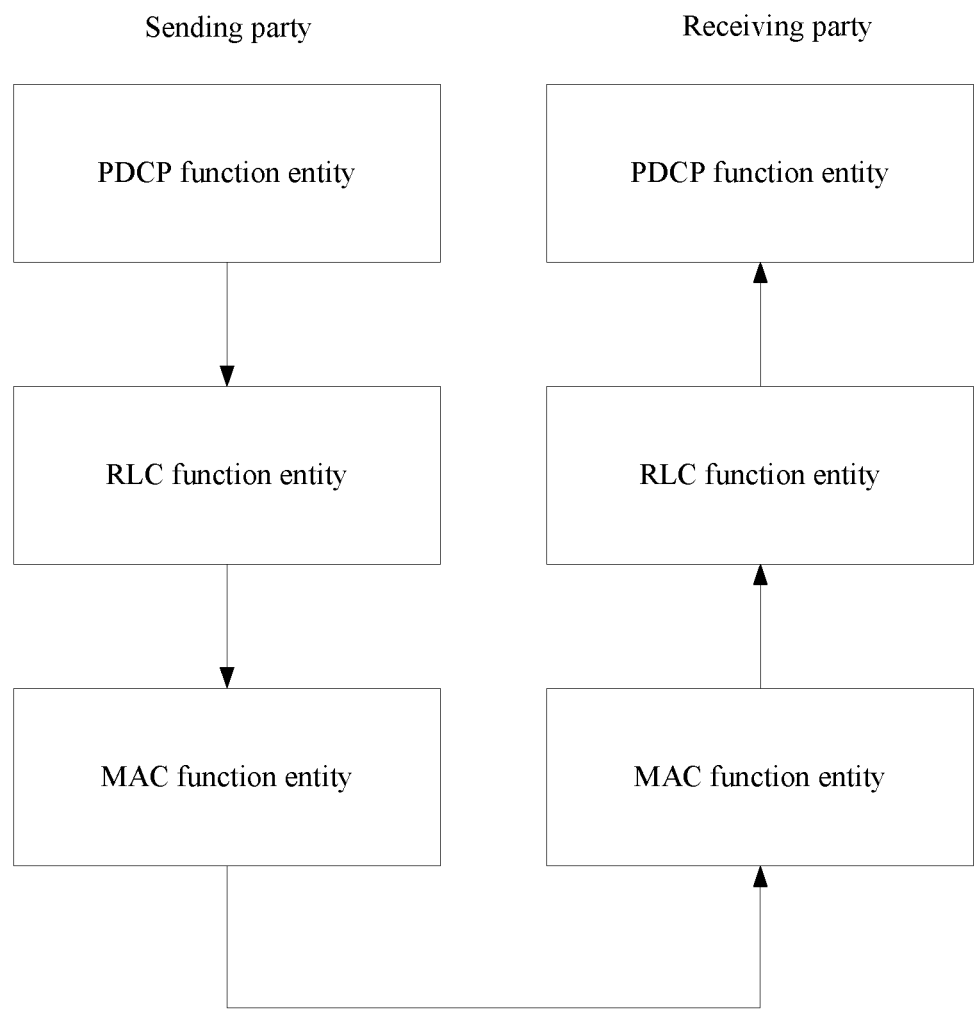
FIG. 2 is a schematic diagram of an architecture according to the disclosure.

FIG. 1 is a schematic diagram of a communications system according to the disclosure. The communications system includes a base station and user equipment (UE). A sending party and a receiving party that are described in the disclosure each may be either of the base station and the UE. For example, the sending party is the base station, and the receiving party is the UE; or the sending party is the UE, and the receiving party is the base station. Entities included in each of the sending party and the receiving party are described by using PDCP function entity, RLC function entity, and media access control (MAC) function entity as an example. As shown in FIG. 2, the sending party includes a PDCP function entity, an RLC function entity, and a MAC function entity; and the receiving party also includes a PDCP function entity, an RLC function entity, and a MAC function entity. However, the entities included in each of the sending party and the receiving party are not limited to the PDCP function entity, the RLC function entity, and the MAC function entity. The technical solutions of the disclosure may also be applied to entities, in other systems, having functions that are the same as those of the PDCP function entity, the RLC function entity, and the MAC function entity but using other names. This is not limited in the disclosure. The technical solutions of the disclosure do not support configuration of availability of an RLC SN.

The following provides detailed descriptions by using specific embodiments. The following several specific embodiments may be combined with one another, and a same or similar concept or process may not be repeatedly described in some embodiments.

Figure 3:
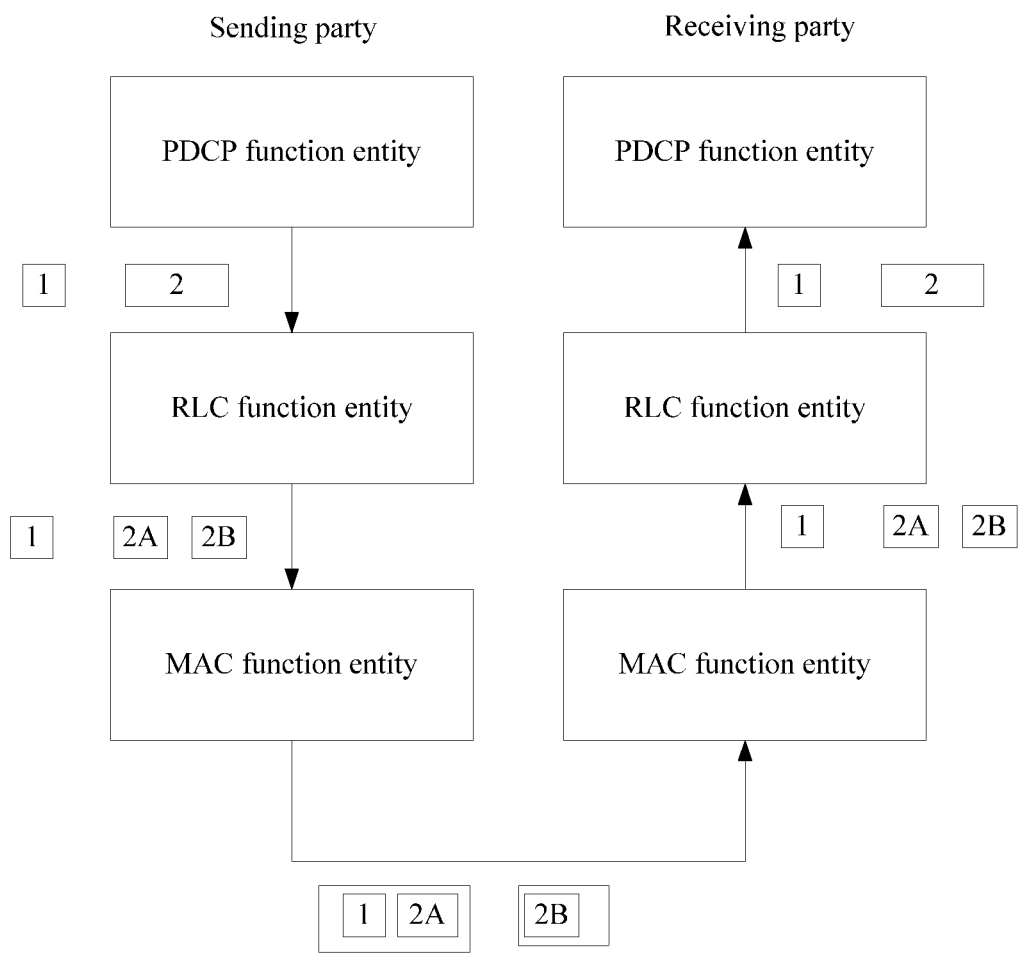
FIG. 3 is a schematic diagram of a scenario according to the disclosure.

FIG. 3 is a schematic diagram of a scenario according to the disclosure. As shown in FIG. 3, in the scenario in this embodiment, a receiving RLC function entity is responsible for restoring a data packet, but does not re-sort data packets. For example, a sending PDCP function entity sends a data packet 1 and a data packet 2 to a sending RLC function entity. The sending RLC function entity performs only segmentation and does not perform concatenation. The sending RLC function entity segments the data packet 2 into a segment 2A and a segment 2B to generate three RLC PDUs, and sends the three RLC PDUs to a sending MAC function entity. The sending MAC function entity places the data packet 1 and the segment 2A in one transport block and places the segment 2B individually in one transport block. The sending MAC function entity sends the two transport blocks to a receiving MAC function entity. The receiving MAC function entity demultiplexes the two transport blocks into the three RLC PDUs: the data packet 1, the segment 2A, and the segment 2B, and sends the three RLC PDUs to the receiving RLC function entity. The receiving RLC function entity performs different processing depending on whether the RLC PDUs are segments, and directly delivers the data packet 1 to a receiving PDCP function entity. The receiving RLC function entity combines the segments into a data packet, and delivers the data packet to the receiving PDCP function entity.

Implementations of determining, by the RLC function entity, whether a type of an RLC PDU is a segment include but are not limited to the following several implementations.

In one embodiment, the receiving RLC function entity determines, based on content in an RLC PDU header, whether the type of the RLC PDU is the segment.

Specifically, the receiving RLC function entity may determine, based on a serial number and a segment offset (SO) that are in the RLC PDU header, or based on an FI in the RLC PDU header, whether the type of the RLC PDU is the segment.

Figure 4:
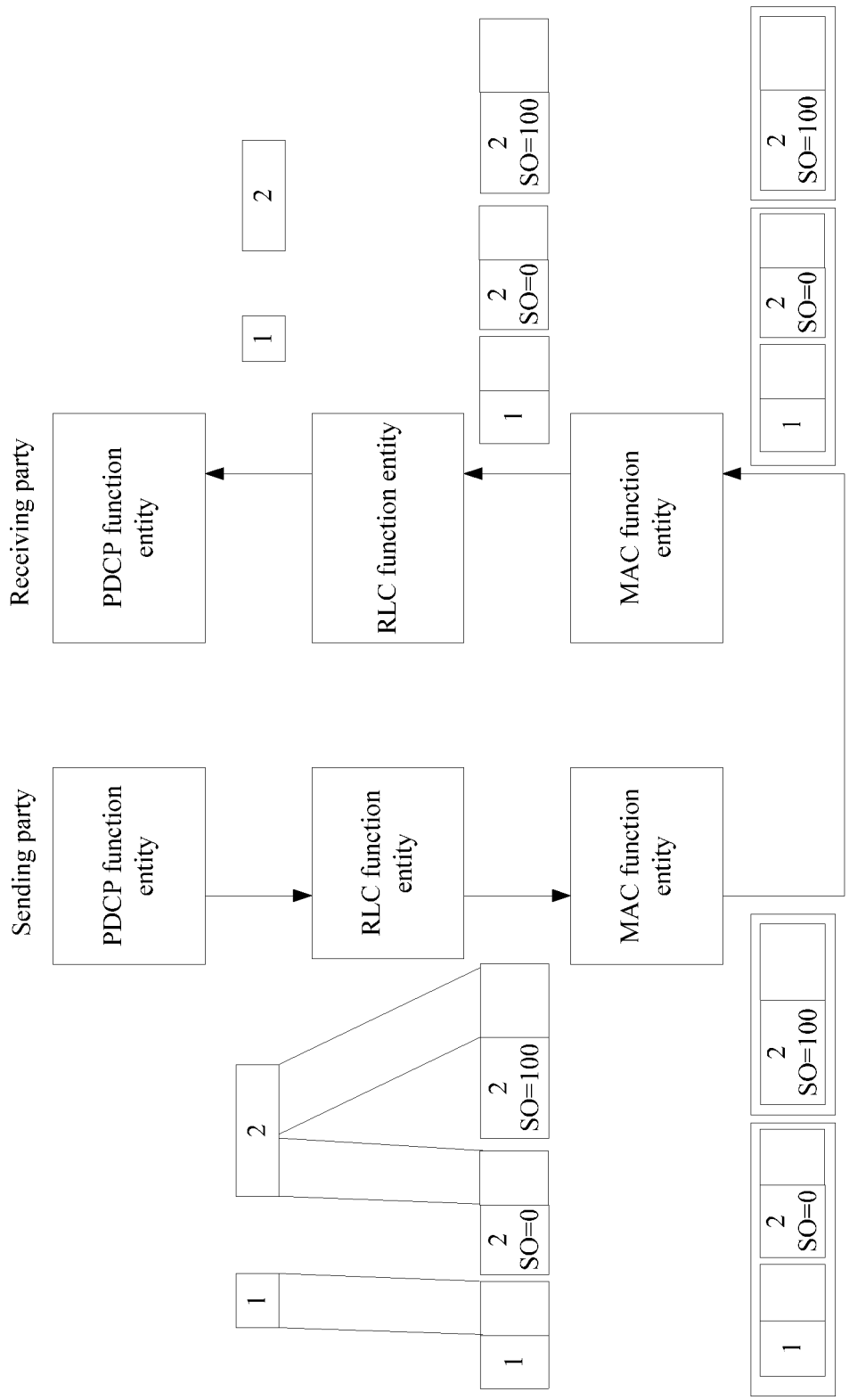
FIG. 4 is a schematic structural diagram of an RLC PDU according to the disclosure.

The implementation of determining the type of the RLC PDU based on the serial number and the SO that are in the RLC PDU header is as follows:

As shown in FIG. 4, a sending RLC function entity adds an RLC PDU header to each RLC PDU. As shown in FIG. 4, if the sending RLC function entity segments a data packet, the RLC PDU header includes a serial number and an SO.

If the sending RLC function entity does not segment a data packet, the RLC PDU header includes a serial number and does not include an SO. A receiving RLC function entity may determine, depending on whether the RLC PDU header includes the SO, whether a type of an RLC PDU is a segment. If the RLC PDU header includes the serial number and the SO, the receiving RLC function entity determines that the type of the RLC PDU is the segment; or if the RLC PDU header does not include the SO, the receiving RLC function entity determines that the type of the RLC PDU is a data packet.

Figure 5:
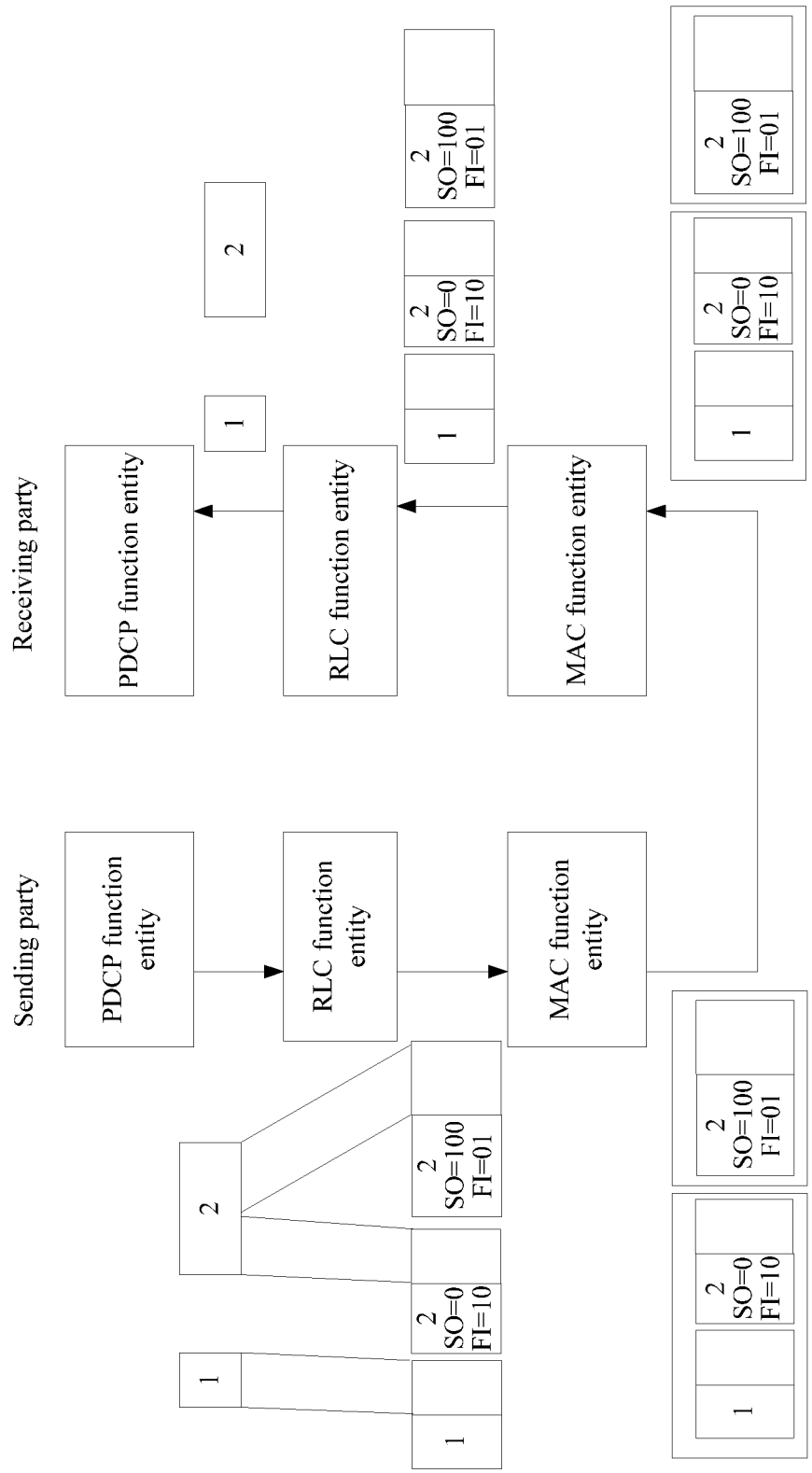
FIG. 5 is a schematic structural diagram of another RLC PDU according to the disclosure.
Figure 6:
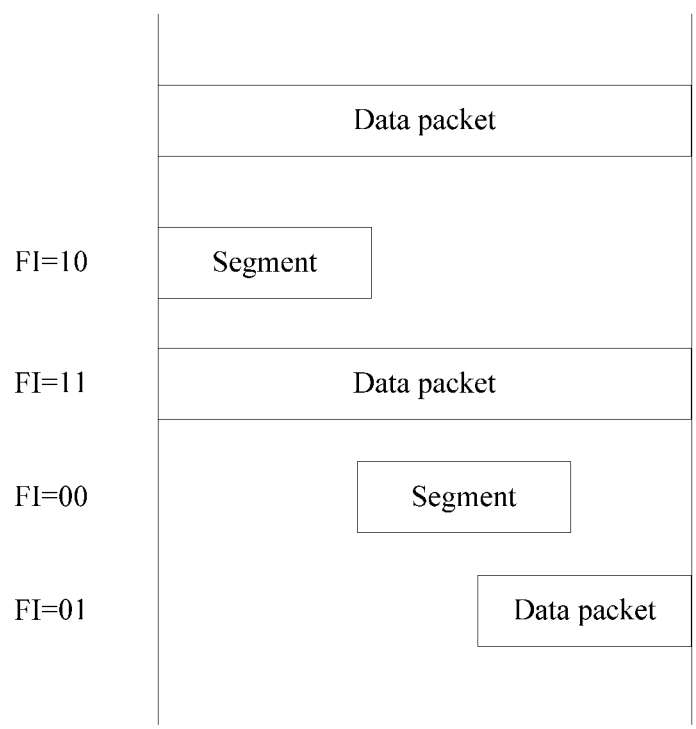
FIG. 6 is a schematic diagram of a type of an RLC PDU according to the disclosure.

The implementation of determining the type of the RLC PDU based on the FI in the RLC PDU header is as follows:

As shown in FIG. 5, a sending RLC function entity adds an RLC PDU header to each RLC PDU. The RLC PDU header includes an FI. A length of the FI is two bits. A first bit indicates whether a start location of the RLC PDU is a start location of a data packet to which the RLC PDU belongs. A value of 1 indicates that the start location of the RLC PDU is the start location of the data packet to which the RLC PDU belongs, and a value of 0 indicates that the start location of the RLC PDU is not the start location of the data packet to which the RLC PDU belongs. A second bit indicates whether an end location of the RLC PDU is an end location of the data packet to which the RLC PDU belongs. A value of 1 indicates that the end location of the RLC PDU is the end location of the data packet to which the RLC PDU belongs, and a value of 0 indicates that the end location of the RLC PDU is not the end location of the data packet to which the RLC PDU belongs. Therefore, if the first bit of the FI in the RLC PDU header indicates that the start location of the RLC PDU is not the start location of the data packet to which the RLC PDU belongs, or the second bit of the FI indicates that the end location of the RLC PDU is not the end location of the data packet to which the RLC PDU belongs, a receiving RLC function entity determines that a type of the RLC PDU is a segment. The FI has four possible representations. As shown in FIG. 6, FI=10, FI=01, and FI=00 indicate that the type of the RLC PDU corresponding to the FI is a segment, and FI=11 indicates that the type of the RLC PDU is a data packet.

In another embodiment, the receiving RLC function entity determines, based on content in a header of a MAC SDU corresponding to the RLC PDU, whether the type of the RLC PDU is the segment.

After segmenting a data packet, the sending RLC function entity notifies the sending MAC function entity of detailed information of segments. The sending MAC function entity encapsulates the detailed information of the segments into MAC SDU headers. The detailed information of these segments may be a serial number, an SO, and/or an FI. After reading these MAC SDU headers, the receiving MAC function entity determines that a type of an RLC PDU corresponding to a MAC SDU is a segment or a data packet, and notifies the receiving RLC function entity of the type. Alternatively, the receiving MAC function entity directly instructs the receiving RLC function entity to read the detailed information of the segments from a corresponding MAC SDU header, and determines the type of the RLC PDU based on the detailed information of the segments. Alternatively, the receiving MAC function entity determines the type of the RLC PDU based on statuses of all MAC SDUs in a transport block, and notifies the receiving RLC function entity of the type. The sending MAC assembles a data packet 1, a data packet 2A, a data packet 2B, a data packet 3, a data packet 4, and a data packet 5A into two transport blocks. A first transport block includes the data packet 1 and data packet 2A; and a second transport block includes the data packet 2B, the data packet 3, the data packet 4, and the data packet 5A. The MAC SDUs in each transport block are sorted according to an order of data packets when the MAC SDUs do not include retransmitted segments. Therefore, it can be determined that both a second MAC SDU and a third MAC SDU among the four MAC SDUs in the second transport block of the MAC are complete data packets.

Figure 7:
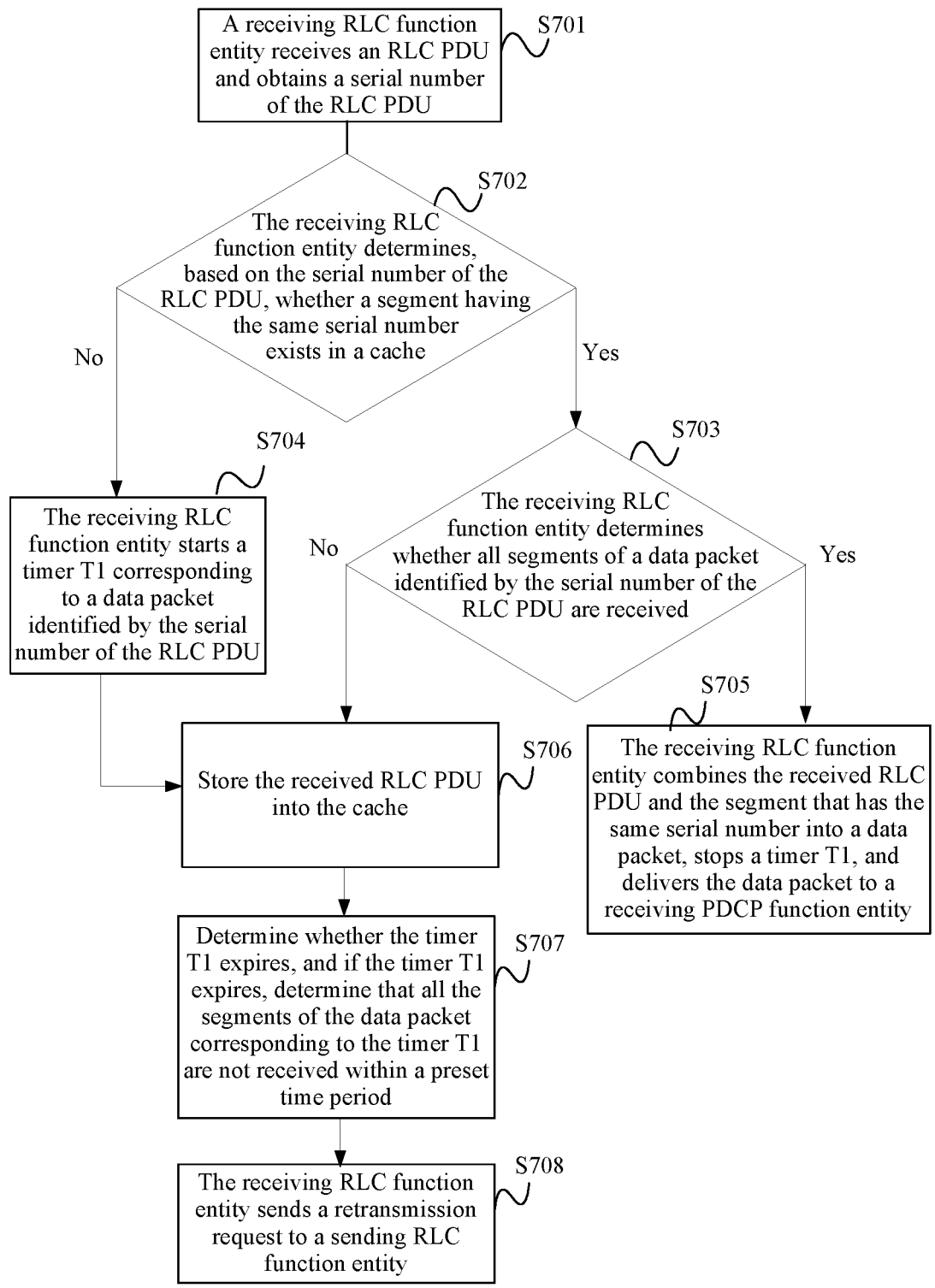
FIG. 7 is a schematic flowchart of a segment retransmission method according to the disclosure.

FIG. 7 is a schematic flowchart of a segment retransmission method according to the disclosure. FIG. 7 shows operations performed when it is determined that a type of an RLC PDU is a segment.

Operation S701: A receiving RLC function entity receives an RLC PDU and obtains a serial number of the RLC PDU.

In one embodiment, the serial number is obtained from an RLC PDU header.

A sending party stores, into each RLC PDU header, a serial number of an RLC PDU. RLC PDUs of all segments of one data packet have a same serial number.

In another embodiment, a receiving MAC function entity notifies the receiving RLC function entity of the serial number.

A sending MAC function entity stores, into each MAC SDU header, a serial number of an RLC PDU corresponding to a MAC SDU. The receiving MAC function entity reads the serial number from the MAC SDU header, and notifies the receiving RLC function entity of the serial number.

Alternatively, the receiving MAC function entity determines, based on a known serial number of a MAC SDU in a received transport block, a serial number of a MAC SDU corresponding to the RLC PDU, and notifies the receiving RLC function entity of the serial number. To be specific, the receiving MAC function entity receives a transport block, where the transport block includes at least three MAC SDUs, and a second MAC SDU to a penultimate MAC SDU are complete data packets, and may determine, based on a serial number of the second MAC SDU or the penultimate MAC SDU, a serial number of a data packet to which a first MAC SDU or a last MAC SDU in the transport block belongs.

Operation S702: The receiving RLC function entity determines, based on the serial number of the RLC PDU, whether a segment having the same serial number exists in a cache, and if a segment having the same serial number exists, performs S703, or if no segment having the same serial number exists, performs S704.

If no segment having the same serial number exists, it indicates that any other segment in a data packet identified by the serial number of the RLC PDU has not been received. Therefore, the received RLC PDU is a first segment of the data packet identified by the serial number of the RLC PDU. A first segment, of a specific data packet, described in the disclosure is an RLC PDU, of the specific data packet, first received by the receiving party. For example, a data packet 1 includes three RLC PDUs: an RLC PDU 1, an RLC PDU 2, and an RLC PDU 3. The receiving party first receives the RLC PDU 2, then receives the RLC PDU 3, and finally receives the RLC PDU 1 in sequence. In this way, the RLC PDU 2 is a first segment of the data packet 1.

If a segment having the same serial number exists, it indicates that another segment of a data packet identified by the serial number of the RLC PDU has been received.

Operation S703: The receiving RLC function entity determines whether all segments of a data packet identified by the serial number of the RLC PDU are received, and if all the segments of the data packet identified by the serial number of the RLC PDU are received, performs S705, or if no, performs S706.

Operation S704: The receiving RLC function entity starts a timer T1 corresponding to a data packet identified by the serial number of the RLC PDU, and performs S706.

Timing duration of the timer T1 is a period of time.

Operation S705: The receiving RLC function entity combines the received RLC PDU and the segment that has the same serial number into a data packet, stops a timer T1, and delivers the data packet to a receiving PDCP function entity.

Operation S706: Store the received RLC PDU into the cache.

Operation S707: Determine whether the timer T1 expires, and if the timer T1 expires, determine that all the segments of the data packet corresponding to the timer T1 are not received within a preset time period.

Operation S708: The receiving RLC function entity sends a retransmission request to a sending RLC function entity.

The retransmission request includes a serial number of a data packet corresponding to an expired timer, and the retransmission request is used to request to retransmit an unreceived segment of the data packet identified by the serial number.

Figure 8:
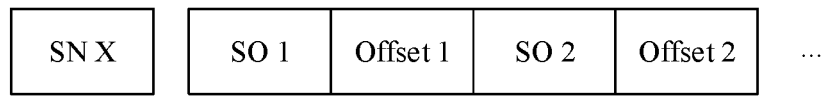
FIG. 8 is a schematic diagram of a format of a retransmission request according to the disclosure.

In one embodiment, a format of the retransmission request is shown in FIG. 8, including the serial number of the data packet corresponding to the expired timer, and a start location and an offset of the unreceived segment of the data packet identified by the serial number.

Figure 9:
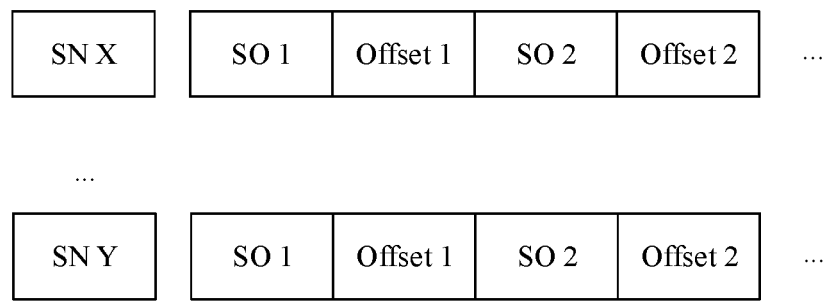
FIG. 9 is a schematic diagram of a format of another retransmission request according to the disclosure.

In one embodiment, the retransmission request may alternatively include a serial number of a data packet corresponding to an unexpired timer, and a start location and an offset of the unreceived segment of the data packet identified by the serial number. A format is shown in FIG. 9. An SN in each row indicates a serial number of a data packet, and a set of an SO and a length indicates that a data segment, inside the data packet, starting from the SO and having a length of an offset has not been received. The sending party is requested to retransmit the data segment. From a perspective of the sending party, the data segment that starts from the SO and that has the length of the offset may be one segment, or may be a plurality of segments.

In one embodiment, the retransmission request includes receiving status information of at least one data packet;

the at least one data packet includes the data packet corresponding to the first timer T1; and receiving status information of each data packet includes:

a serial number of a data packet corresponding to all segments that have been received; or a serial number of a data packet corresponding to any segment that is not received; or a serial number of a data packet corresponding to some segments that are received, and identifiers of the some segments, where the identifiers of the some segments include start locations of the segments and offsets of the segments; or a serial number of a data packet corresponding to some segments that are not received, and identifiers of the some segments that are not received, where the identifiers of the some segments include start locations of the segments and offsets of the segments.

Figure 10:
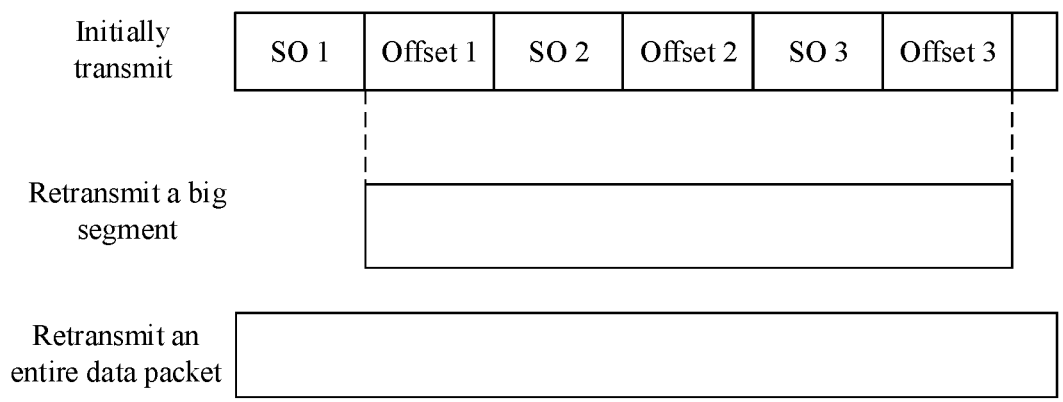
FIG. 10 is a schematic diagram of a format of a retransmitted data packet according to the disclosure.

During retransmission, the sending party may retransmit, according to the retransmission request of the receiving party, only an unreceived segment; or may retransmit the entire data packet identified by the serial number, as shown in FIG. 10. This is not limited in the disclosure.

When the entire data packet identified by the serial number is retransmitted, the receiving RLC function entity needs to perform deduplication processing. Specifically, the receiving RLC function entity determines whether a type of a received and retransmitted RLC PDU is a data packet; and if the type is the data packet, determines whether a segment corresponding to the data packet exists in the cache, that is, determines, based on a serial number of the data packet, whether a segment having the same serial number exists in the cache, and if a segment having the same serial number exists, deletes the segment from the cache. For an implementation of determining, by the receiving RLC function entity, whether the type of the received and retransmitted RLC PDU is the data packet, refer to detailed descriptions in the foregoing embodiments. Details are not described herein again.

In this embodiment, if the receiving RLC function entity has not received, within the preset time period, all segments of a data packet identified by a serial number, the receiving RLC function entity sends a retransmission request to the sending party, where the retransmission request includes the serial number, to request the sending party to retransmit an unreceived segment of the data packet identified by the serial number. This implements segment retransmission triggered by the receiving RLC function entity, avoids data packet retransmission of the receiving PDCP function entity, and reduces an average data packet transmission latency.

Figure 11A:
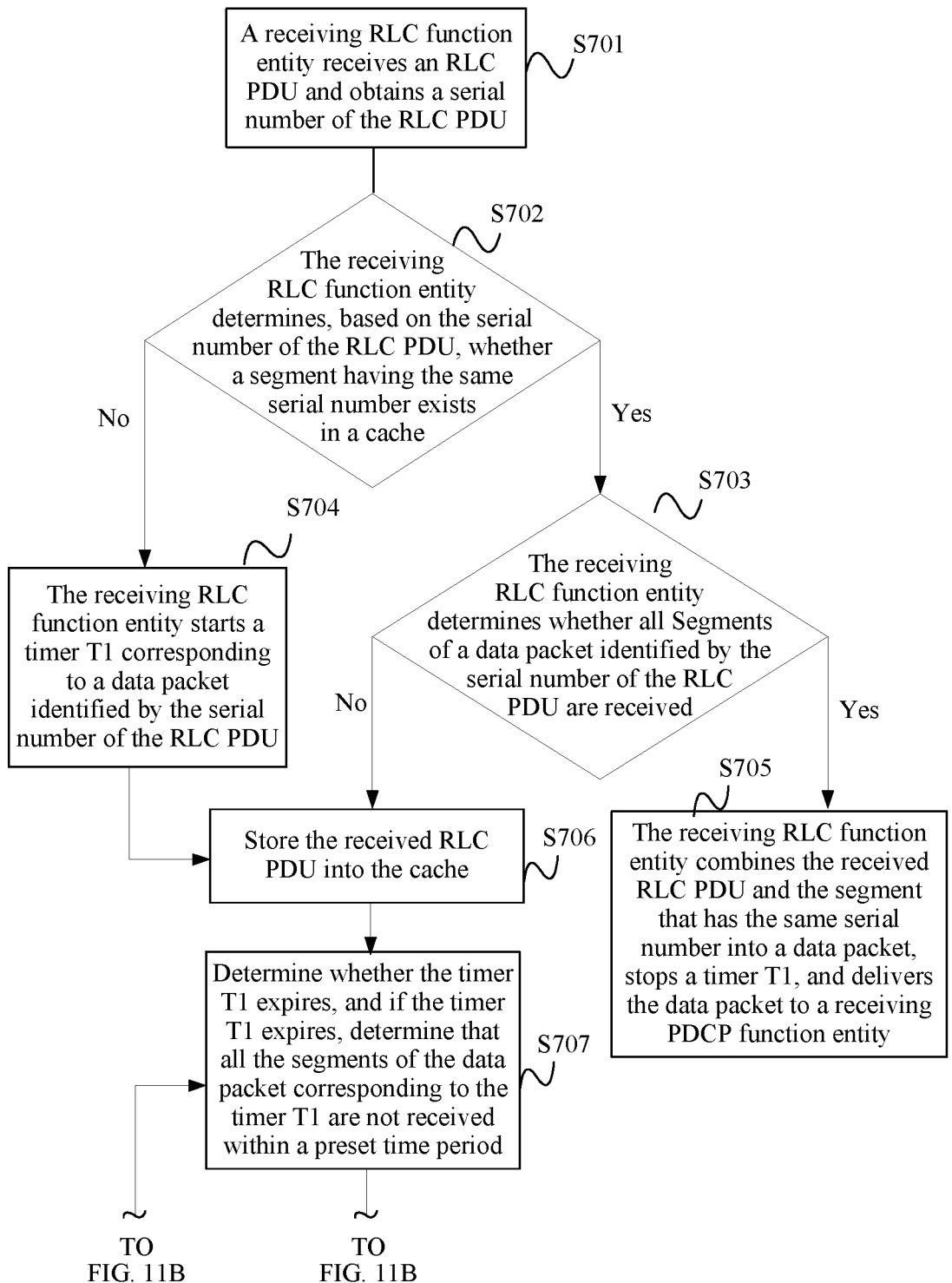
FIG. 11A and FIG. 11B are a schematic flowchart of another segment retransmission method according to the disclosure.
Figure 11B:
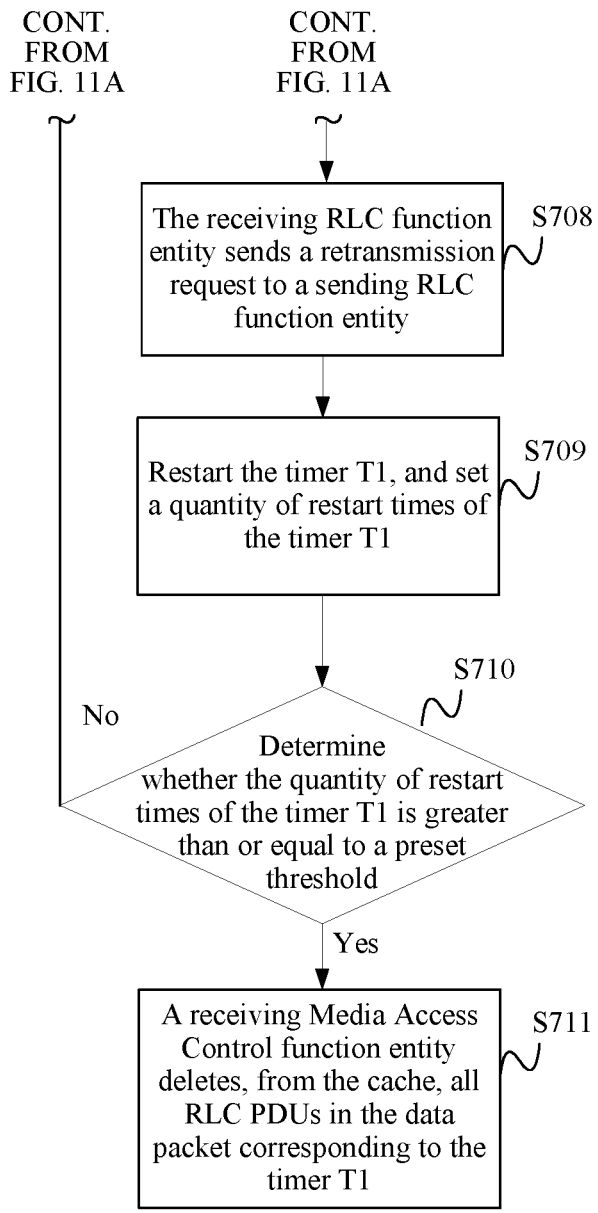

FIG. 11A and FIG. 11B are a schematic flowchart of another segment retransmission method according to the disclosure. FIG. 11A and FIG. 11B are based on the embodiment shown in FIG. 7. After S708, the method further includes the following operations.

Operation S709: Restart the timer T1, and set a quantity of restart times of the timer T1.

The quantity of restart times of the timer T1 is incremented by 1 each time the timer T1 is restarted.

Operation S710: Determine whether the quantity of restart times of the timer T1 is greater than or equal to a preset threshold, and if yes, perform S711, or if no, return to S707.

The preset threshold is preconfigured at a radio resource control (RRC) layer. The preset threshold is an integer greater than or equal to 1.

Operation S711: A receiving media access control function entity deletes, from the cache, all RLC PDUs in the data packet corresponding to the timer T1.

In this embodiment, the quantity of restart times of the timer T1 is limited, to avoid a deadlock that occurs because the receiving RLC function entity never receives one or more particular segments.

Figure 12:
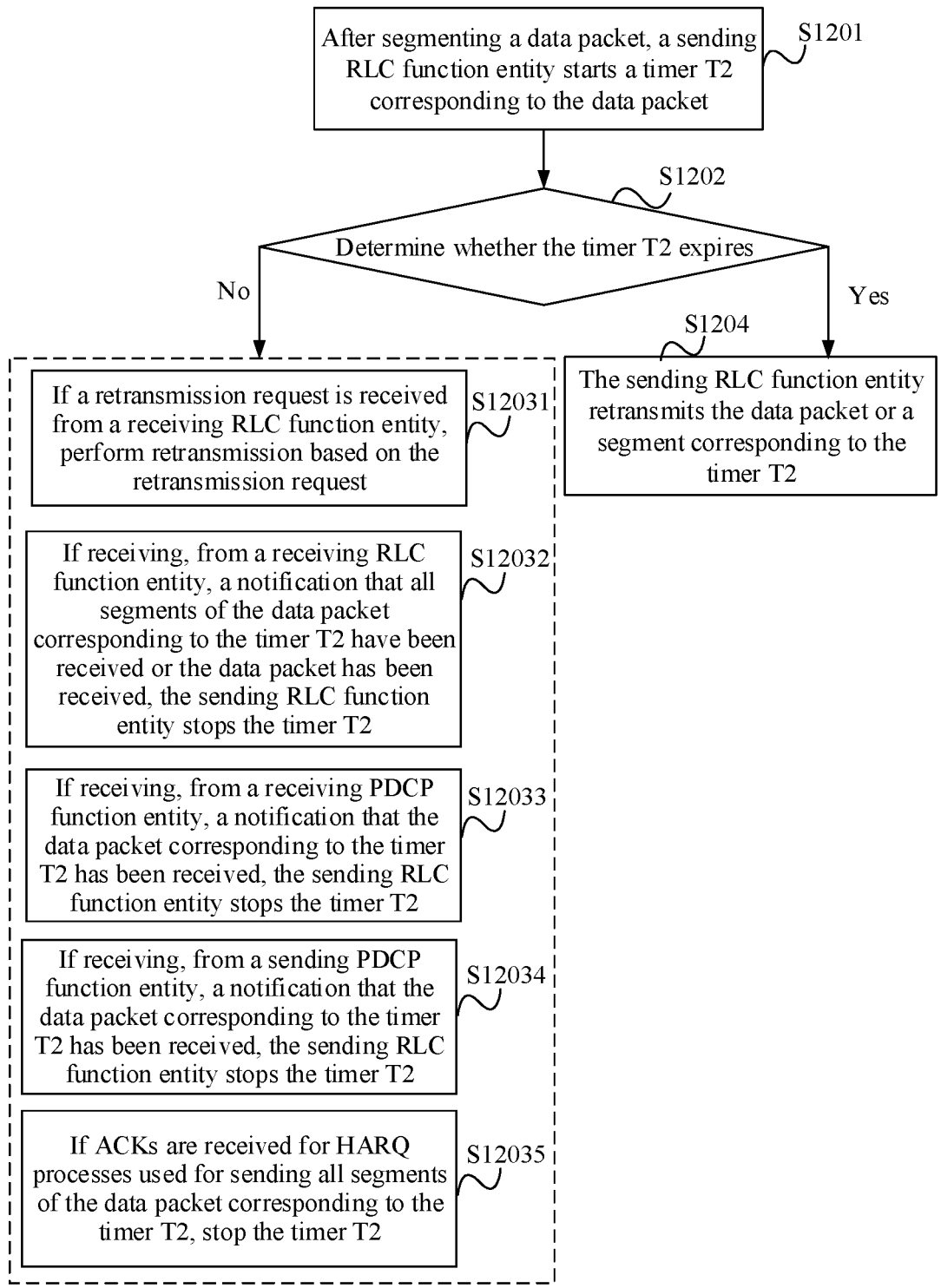
FIG. 12 is a schematic flowchart of still another segment retransmission method according to the disclosure.

FIG. 12 is a schematic flowchart of still another segment retransmission method according to the disclosure. As shown in FIG. 12, the method in this embodiment is as follows:

Operation S1201: After segmenting a data packet, a sending RLC function entity starts a timer T2 corresponding to the data packet.

Operation S1202: Determine whether the timer T2 expires, and if no, perform any operation in S12031 to S12035, or if yes, perform S1204.

Operation S12031: If a retransmission request is received from a receiving RLC function entity, perform retransmission according to the retransmission request.

Operation S12032: If receiving, from a receiving RLC function entity, a notification that all segments of the data packet corresponding to the timer T2 have been received or the data packet corresponding to the timer T2 has been received, the sending RLC function entity stops the timer T2.

Operation S12033: If the sending RLC function entity receiving, from a receiving PDCP function entity, a notification that the data packet corresponding to the timer T2 has been received, the sending RLC function entity stops the timer T2.

Operation S12034: If receiving, from a sending PDCP function entity, a notification that the data packet corresponding to the timer T2 has been received, the sending RLC function entity stops the timer T2.

Operation S12035: If ACKs are received for HARQ processes used for sending all segments of the data packet corresponding to the timer T2, stop the timer T2.

Operation S1204: The sending RLC function entity retransmits the data packet or a segment corresponding to the timer T2.

The sending RLC function entity may transmit, in a manner of segmenting the data packet corresponding to the timer T2 during first transmission, the data packet corresponding to the timer T2, or may re-segment the data packet corresponding to the timer T2, or may not segment the data packet corresponding to the timer T2.

In this embodiment, after segmenting the data packet, the sending RLC function entity starts the timer T2 corresponding to the data packet; and if the timer expires, the sending RLC function entity proactively retransmits the data packet corresponding to the timer T2. In this way, a data packet transmission speed is increased, and a data packet transmission latency is shortened.

Figure 13:
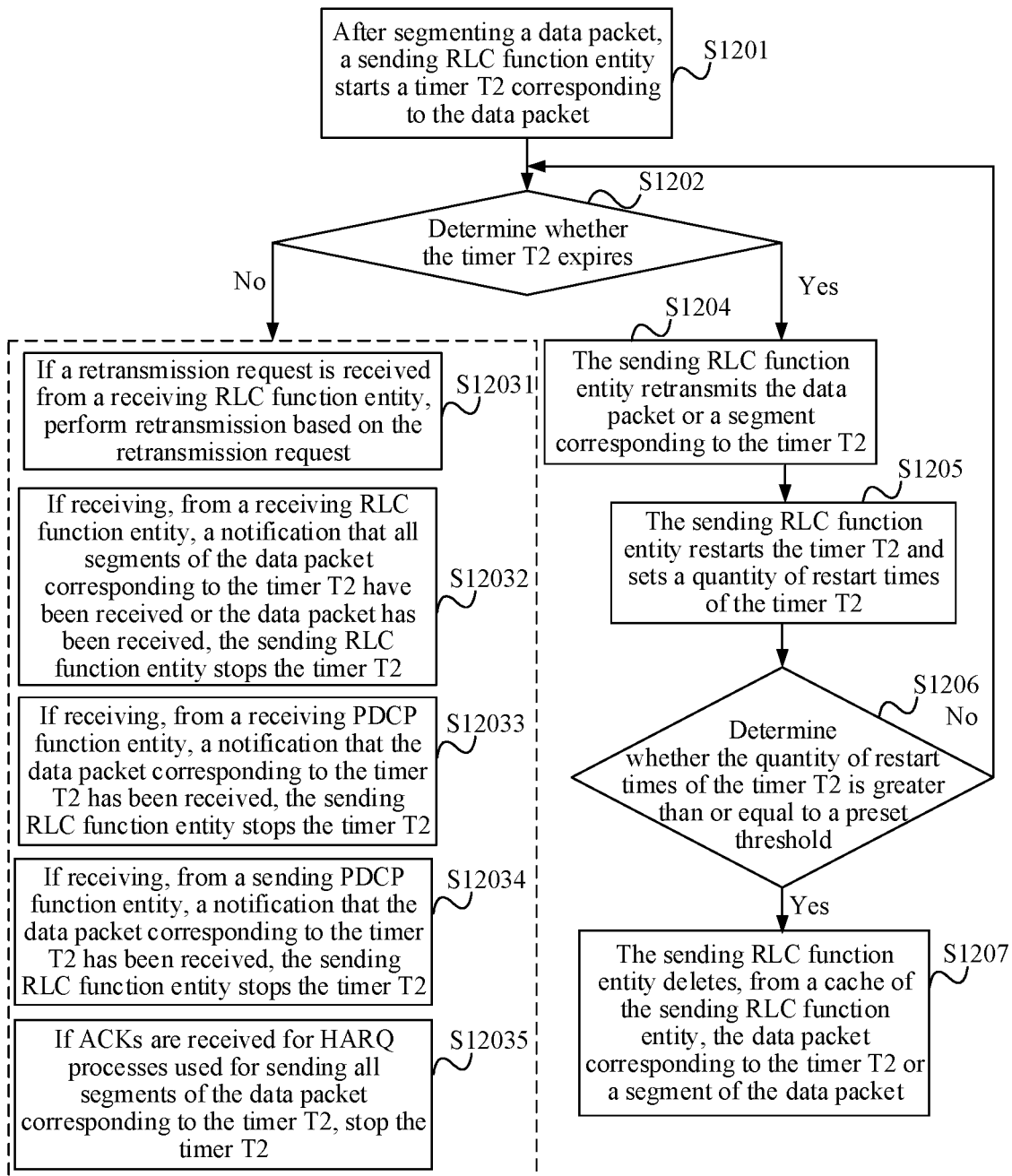
FIG. 13 is a schematic flowchart of yet another segment retransmission method according to the disclosure.

FIG. 13 is a schematic flowchart of yet another segment retransmission method according to the disclosure. FIG. 13 is based on the embodiment shown in FIG. 12. After S1204, the method further includes the following operations.

Operation S1205: The sending RLC function entity restarts the timer T2 and sets a quantity of restart times of the timer T2.

The quantity of restart times of the timer T2 is incremented by 1 each time the timer T2 is restarted.

Operation S1206: Determine whether the quantity of restart times of the timer T2 is greater than or equal to a preset threshold, and if yes, perform S1207, or if no, return to S1202.

The preset threshold is preconfigured at a radio resource control RRC) layer. The preset threshold is an integer greater than or equal to 1.

Operation S1207: The sending RLC function entity deletes, from a cache of the sending RLC function entity, the data packet corresponding to the timer T2 or a segment of the data packet corresponding to the timer T2.

In other words, a retransmission request of the receiving party for the data packet or the segment of the data packet is no longer responded to.

In this embodiment, the quantity of restart times of the timer T2 is limited, to avoid a deadlock that occurs because the sending RLC function entity keeps retransmitting one or more particular segments.

In one embodiment, as an alternative solution of the embodiment shown in FIG. 13, the sending RLC function entity may set a timer T3 corresponding to a data packet, and after the timer T3 expires, an RLC status report sent by the receiving RLC function entity is no longer responded to. To be specific, after the timer T3 expires, even if the RLC status report indicates that a segment of the data packet corresponding to the timer T3 has not been received successfully, the sending RLC function entity no longer retransmits the data packet corresponding to the timer T3.

Figure 14:
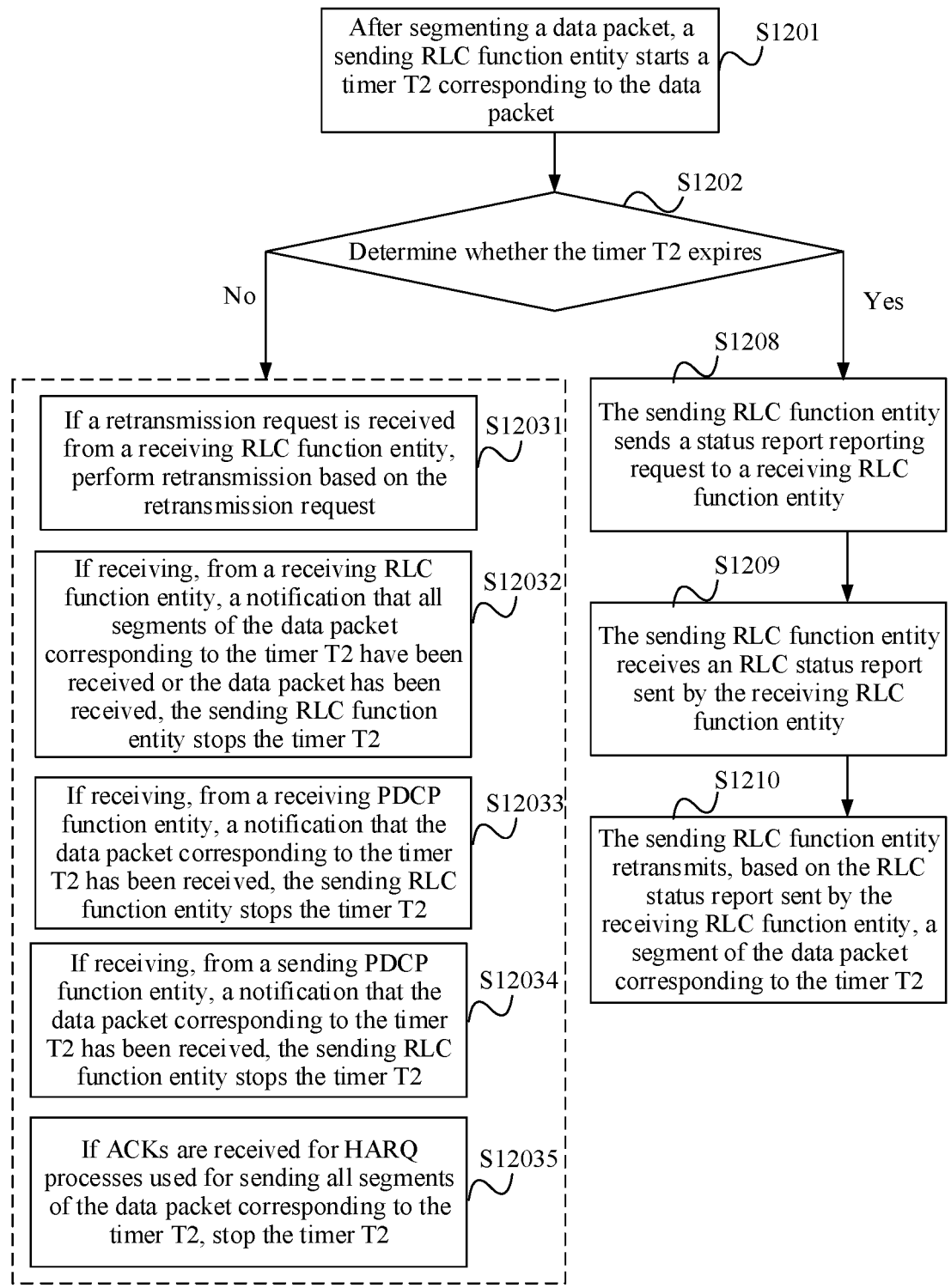
FIG. 14 is a schematic flowchart of still yet another segment retransmission method according to the disclosure.

FIG. 14 is a schematic flowchart of still yet another segment retransmission method according to the disclosure. FIG. 14 is based on the embodiment shown in FIG. 12. Further, if the timer T2 expires, S1208 to S1210 are performed.

Operation S1208: The sending RLC function entity sends a status report reporting request to a receiving RLC function entity.

The status report reporting request includes a serial number of the data packet corresponding to the timer T2, to request the receiving RLC function entity to report a receiving status of at least one data packet. The at least one data packet includes the data packet corresponding to the timer T2.

In one embodiment, the status report reporting request may be indicated by one bit. When the bit is 1, the receiving RLC function entity reports receiving status information of all data packets; or when the bit is 0, the receiving RLC function entity reports receiving status information of only a data packet that is not received correctly.

In another embodiment, the status report reporting request includes a serial number list of the data packet requested to be reported, and the receiving RLC function entity may report receiving status information of the data packet corresponding to the serial number list.

Operation S1209: The sending RLC function entity receives an RLC status report sent by the receiving RLC function entity.

The RLC status report includes receiving status information of the at least one data packet, and the at least one data packet includes the data packet corresponding to the timer T2.

Figure 15:
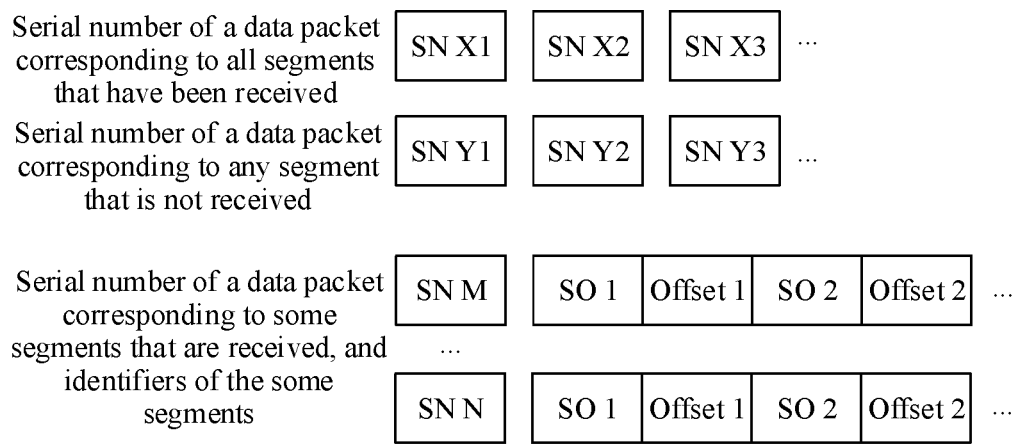
FIG. 15 is a schematic diagram of receiving status information according to the disclosure.

As shown in FIG. 15, receiving status information of each data packet includes:

a serial number of a data packet corresponding to all segments that have been received; or a serial number of a data packet corresponding to any segment that is not received; or a serial number of a data packet corresponding to some segments that are received, and identifiers of the some segments, where the identifiers of the some segments include start locations of the segments and offsets of the segments.

Operation S1210: The sending RLC function entity retransmits, based on the RLC status report sent by the receiving RLC function entity, a segment of the data packet corresponding to the timer T2.

In this embodiment, the sending RLC function entity sends the status report reporting request to the receiving RLC function entity, to retransmit, based on the RLC status report sent by the receiving RLC function entity, the segment of the data packet corresponding to the timer T2. In this way, retransmission is more targeted, transmission resources are saved, and transmission efficiency is improved.

Figure 16:
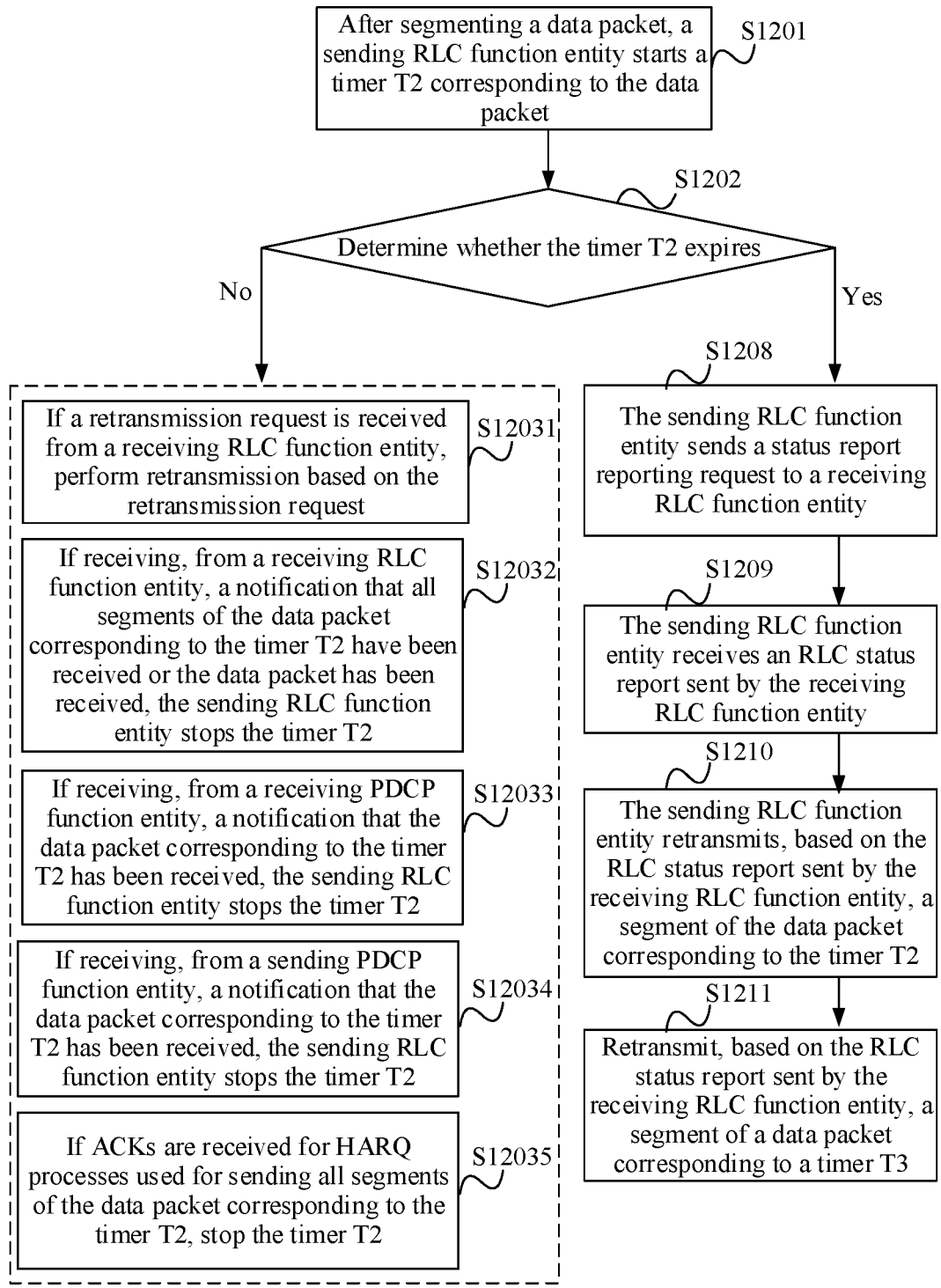
FIG. 16 is a schematic flowchart of a further segment retransmission method according to the disclosure.

FIG. 16 is a schematic flowchart of a further segment retransmission method according to the disclosure. FIG. 16 is based on the embodiment shown in FIG. 14. Further, in the foregoing embodiment, optionally, the status report reporting request further includes a serial number of a data packet corresponding to at least one timer T3, and the at least one data packet includes the data packet corresponding to the at least one timer T3. To be specific, when requesting an RLC transmission status of a data packet corresponding to an expired timer, the sending party also requests, in same request information, an RLC transmission status of a data packet corresponding to an unexpired timer, to save transmission resources.

The method further includes the following operation:

Operation S1211: Retransmit, based on the RLC status report sent by the receiving RLC function entity, a segment of a data packet corresponding to a timer T3.

In this embodiment, both the RLC transmission status of the data packet corresponding to the expired timer and the RLC transmission status of the data packet corresponding to the unexpired timer are requested in the same request information, and one RLC status report includes both the transmission status information of the data packet corresponding to the timer T2 and the transmission status information of the data packet corresponding to the timer T3. In this way, transmission resources are saved.

In any one of the foregoing embodiments shown in FIG. 12 to FIG. 16, in one embodiment, in cases including but not limited to the following cases, the sending RLC function entity may be triggered to perform S1208.

In a case, the sending RLC function entity periodically sends the status report reporting request to the receiving RLC function entity. A period needs to be preconfigured.

In another case, the sending RLC function entity sends the status report reporting request to the receiving RLC function entity after transmitting a specific quantity of RLC PDUs. The specific quantity of RLC PDUs needs to be preconfigured.

In still another case, the sending RLC function entity sends the status report reporting request to the receiving RLC function entity after transmitting a specific amount of data, for example, after transmitting N bytes in total. The specific amount of data needs to be preconfigured.

Figure 17:
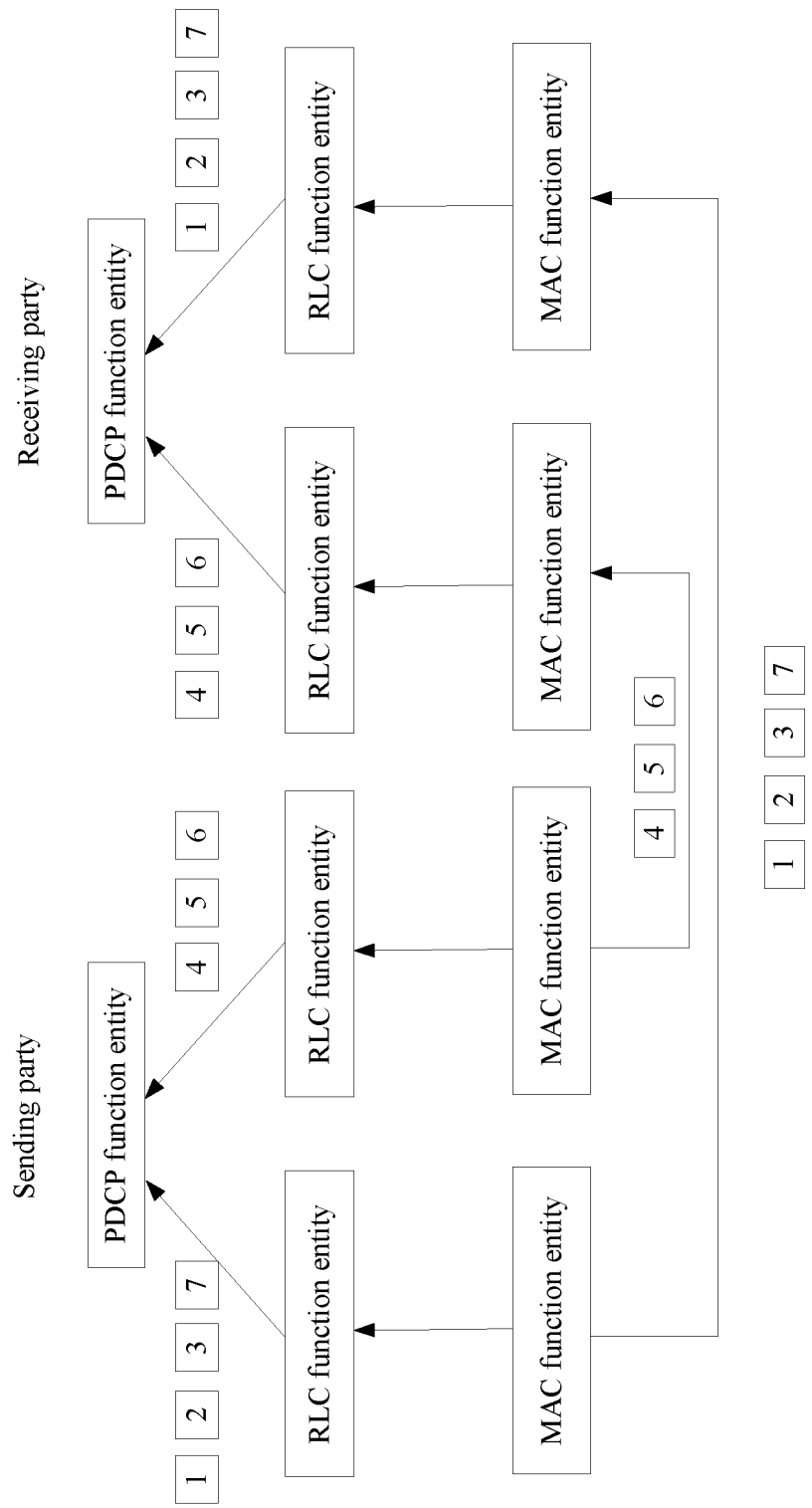
FIG. 17 is a schematic diagram of another scenario according to the disclosure.

FIG. 17 is a schematic diagram of another scenario according to the disclosure. The scenario shown in FIG. 17 is a multi-connectivity scenario. In the multi-connectivity scenario, a sending party sends transport data through at least two (two is used as an example) transmit connections, where the transmit connections include sending RLC function entities and sending MAC function entities, and a sending PDCP function entity is used as an anchor; correspondingly, a receiving party receives the transport data through at least two (two is used as an example) receive connections, where the receive connections include receiving RLC function entities and receiving MAC function entities, and a receiving PDCP function entity is used as an anchor. As shown in FIG. 17, the sending PDCP function entity sends a data packet 1, a data packet 2, a data packet 3, and a data packet 7 through one transmit connection, and sends a data packet 4, a data packet 5, and a data packet 6 through the other transmit connection. The receiving PDCP function entity receives the data packet 1, the data packet 2, the data packet 3, and the data packet 7 through one receive connection, and receives the data packet 4, the data packet 5, and the data packet 6 through the other receive connection. However, when receiving the data packet 1, the data packet 2, the data packet 3, and the data packet 7, the receiving RLC function entity finds that there is an SN gap. There may be two causes. One cause is that the data packet 4, the data packet 5, and the data packet 6 are received through the other receive connection. The other cause is that the data packet 4, the data packet 5, and the data packet 6 fail to be received. Because the receiving RLC function entity cannot confirm which cause results in the SN gap, the receiving RLC function entity cannot determine whether to request retransmission of the data packet 4, the data packet 5, and the data packet 6. To resolve the foregoing problem, the following several embodiments are provided in the disclosure.

Figure 18:
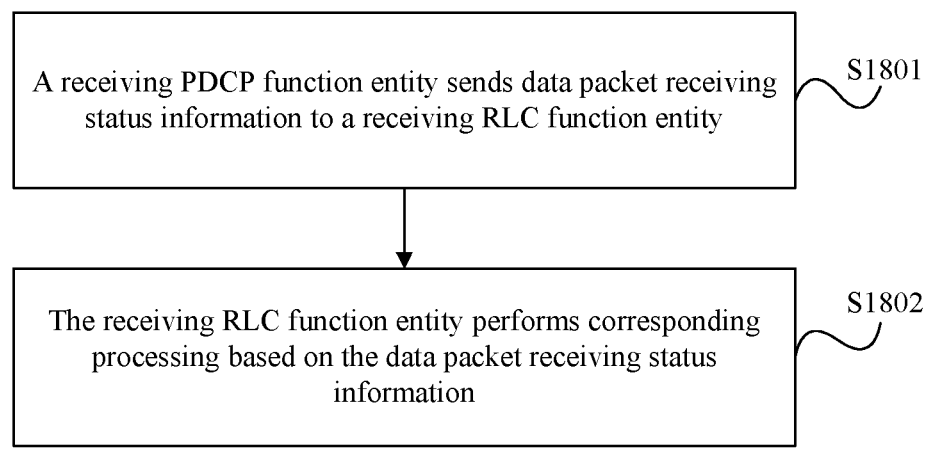
FIG. 18 is a schematic flowchart of a data packet transmission method according to the disclosure.

FIG. 18 is a schematic flowchart of a data packet transmission method according to the disclosure. As shown in FIG. 18, the method includes the following operations.

Operation S1801: A receiving PDCP function entity sends data packet receiving status information to a receiving RLC function entity.

The data packet receiving status information includes all data packets that have been received by the receiving PDCP function entity. Alternatively, the data packet receiving status information includes all data packets received by the receiving PDCP function entity from a receiving RLC function entity in another receive connection.

The receiving PDCP function entity may periodically send the data packet receiving status information to the receiving RLC function entity. Alternatively, the receiving PDCP function entity receives a preset quantity of data packets, and sends data packet receiving status information to the receiving RLC function entity. Alternatively, the receiving PDCP function entity receives a data packet including a preset quantity of bits, and sends data packet receiving status information to the receiving RLC function entity. The preset quantity, the preset quantity of bits, and the like are preconfigured at an RRC layer.

Operation S1802: The receiving RLC function entity performs corresponding processing based on the data packet receiving status information.

In one embodiment, if the receiving PDCP function entity has received, through the another receive connection, a data packet in an SN gap, the receiving RLC function entity determines to deliver a data packet following the SN gap to the receiving PDCP function entity.

If the receiving PDCP function entity has not received a data packet in an SN gap, the receiving RLC function entity sends a retransmission request to a sending party.

After the receiving RLC function entity receives the data packet receiving status information, if the receiving RLC function entity works in an unacknowledged mode (UM), the receiving RLC function entity pushes a lower boundary of a receiving window forward, and pushes, out of the lower boundary of the window, a serial number corresponding to a packet that has been received, where the reception of the packet is notified by the receiving PDCP function entity. If a timer corresponding to the packet is running, the receiving RLC function entity stops the timer, that is, no longer waits for the packet. If the receiving RLC function entity works in an acknowledged mode (AM), the receiving RLC function entity pushes a lower boundary of a receiving window forward, and pushes, out of the lower boundary of the window, a serial number corresponding to a packet that has been received, where the reception of the packet is notified by the receiving PDCP function entity. If a timer corresponding to the packet is running, the receiving RLC function entity stops the timer, that is, no longer triggers retransmission of the packet or a segment of the packet.

In addition, for some data with a particularly high priority, a sending PDCP function entity may deliver one data packet to RLC function entities in at least two transmit connections for sending. In this way, provided that an RLC function entity in one transmit connection transmits the data packet successfully, the data packet can successfully arrive at a receiving PDCP function entity. In this case, if another receiving RLC function entity has received some segments, the another receiving RLC function entity may delete the some segments that have been received and stop a corresponding timer.

Figure 19:
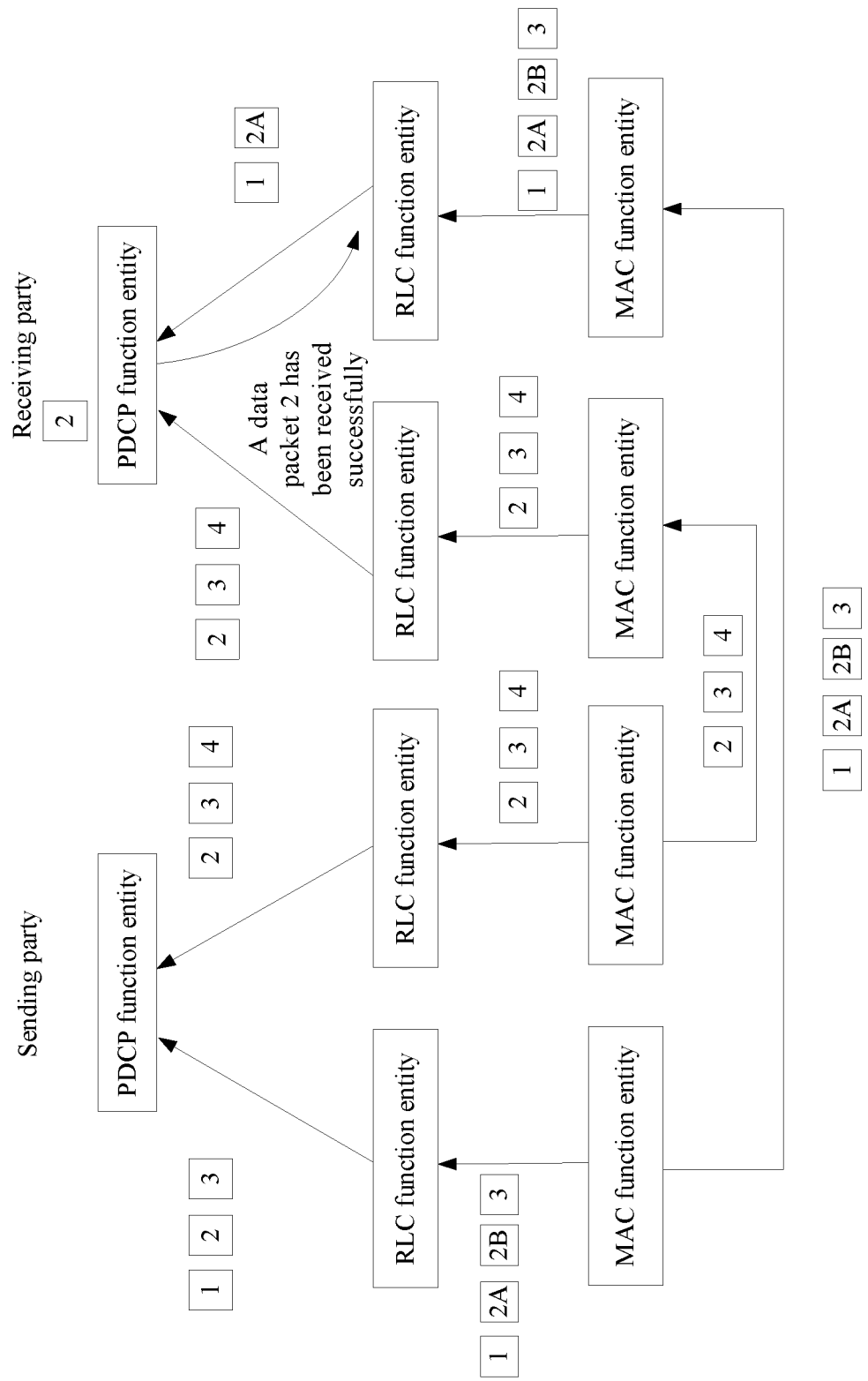
FIG. 19 is a schematic diagram of still another scenario according to the disclosure.

If the receiving RLC function entity has received some segments corresponding to a data packet, but has not completely received all segments of the data packet, the receiving RLC function entity is running a timer corresponding to the data packet. When the timer expires, a status report is triggered. In this scenario, if the receiving RLC function entity receives, from the receiving PDCP function entity, a notification that the data packet has been successfully received by the receiving RLC function entity in the another receive connection, the receiving RLC function entity stops the timer corresponding to the data packet, and deletes the segments corresponding to the data packet that have been received. As shown in FIG. 19, a sending PDCP function entity transmits a data packet 2 and a data packet 3 by using sending RLC function entities in at least two (two is used as an example) transmit connections. The data packet 2 is successfully transmitted to a receiving PDCP function entity by using a sending RLC function entity in one transmit connection, and a sending RLC function entity in the other transmit connection segments the data packet 2. However, all segments have not been transmitted completely. A receiving RLC function entity in a corresponding receive connection has received some segments of the data packet 2, and the receiving RLC function entity that has received the some segments of the data packet 2 receives, from the receiving PDCP function entity, a notification that the data packet 2 has been successfully received by using a receiving RLC function entity in the other receive connection. In this case, the receiving RLC function entity stops a timer corresponding to the data packet 2, and deletes the segments corresponding to the data packet 2 that have been received.

Figure 20:
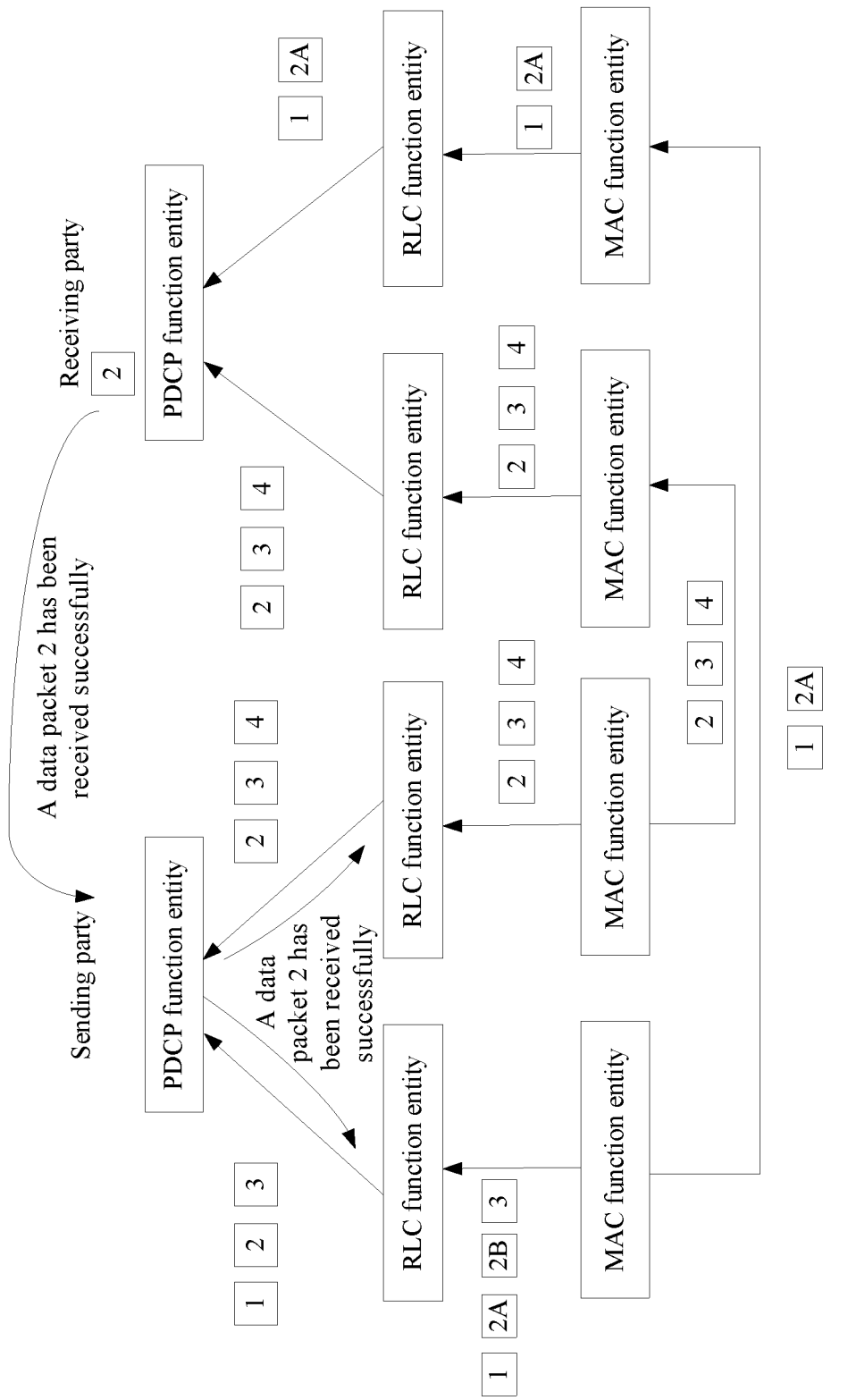
FIG. 20 is a schematic diagram of yet another scenario according to the disclosure.

According to the foregoing solution that "one data packet is delivered to RLC function entities in at least two transmit connections for sending", as shown in FIG. 20, a sending PDCP function entity transmits a data packet 2 and a data packet 3 by using RLC function entities in at least two (two is used as an example) transmit connections. The data packet 2 is successfully transmitted to a receiving PDCP function entity by using an RLC function entity in one transmit connection, and an RLC function entity in the other transmit connection has segmented the data packet 2, but all segments have not been transmitted completely. After receiving the data packet 2, the receiving PDCP function entity notifies the sending PDCP function entity that the data packet 2 has been received successfully. The sending PDCP function entity finds that the sending PDCP function entity once delivered the data packet 2 to the RLC function entities in the two transmit connections for transmission. Therefore, the sending PDCP function entity notifies the RLC function entities in the two transmit connections that the data packet 2 has been received. The RLC function entity that has not completely transmitted all the segments of the data packet 2 finds that the RLC function entity has segmented the data packet 2, and started a timer. In this case, the RLC function entity stops the timer, and no longer requests an RLC status report from a receiving RLC function entity.

In this embodiment, the receiving PDCP function entity sends the data packet receiving status information to the receiving RLC function entity, so that the receiving RLC function entity determines, based on the data packet receiving status information, whether the data packet in the SN gap is transmitted through the other receive connection or fails to be transmitted, and if the data packet is transmitted through the other receive connection, the receiving RLC function entity delivers the data packet following the SN gap to the PDCP function entity, or if the data packet fails to be transmitted, the receiving RLC function entity sends a retransmission request to the sending party. In this way, RLC function entities transmit data packets, a data packet transmission latency is reduced, and a case in which the data packet cannot be delivered to the receiving PDCP function entity because of the SN gap is avoided.

Figure 21:
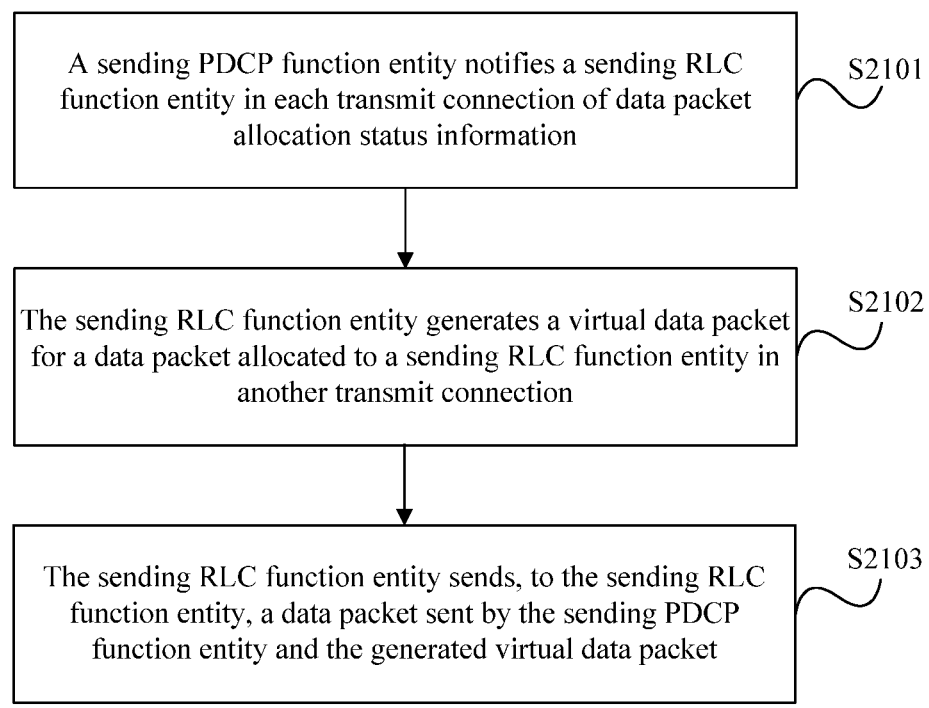
FIG. 21 is a schematic flowchart of another data packet transmission method according to the disclosure.

FIG. 21 is a schematic flowchart of another data packet transmission method according to the disclosure. As shown in FIG. 21, the method in this embodiment is as follows:

Operation S2101: A sending PDCP function entity notifies a sending RLC function entity in each transmit connection of data packet allocation status information.

The data packet allocation status information includes a data packet allocated to a sending RLC function entity in another transmit connection. As shown in FIG. 17, a data packet 1, a data packet 2, a data packet 3, and a data packet 7 are allocated to one transmit connection, and a data packet 4, a data packet 5, and a data packet 6 are allocated to another transmit connection.

Operation S2102: The sending RLC function entity generates a virtual data packet for a data packet allocated to a sending RLC function entity in another transmit connection.

The virtual data packet includes a PDCP packet header and does not include data.

Data packets sent through one transmit connection are the data packet 1, the data packet 2, the data packet 3 (a virtual data packet), the data packet 4 (a virtual data packet), the data packet 5 (a virtual data packet), the data packet 6, and the data packet 7.

Data packets sent through another transmit connection are the data packet 1 (a virtual data packet), the data packet 2 (a virtual data packet), the data packet 3 (a virtual data packet), the data packet 4, the data packet 5, the data packet 6, and the data packet 7 (a virtual data packet).

Operation S2103: The sending RLC function entity sends, to the sending RLC function entity for the another transmit connection, a data packet sent by the sending PDCP function entity and the generated virtual data packet.

In this embodiment, the sending RLC function entity generates the virtual data packet for the data packet allocated to the sending RLC function entity in the other transmit connection, so that data packets sent through each transmit connection include data packets of all serial numbers. In this way, a receiving RLC function entity can directly determine, based on a serial number of a data packet, whether to request data packet retransmission.

Figure 22:
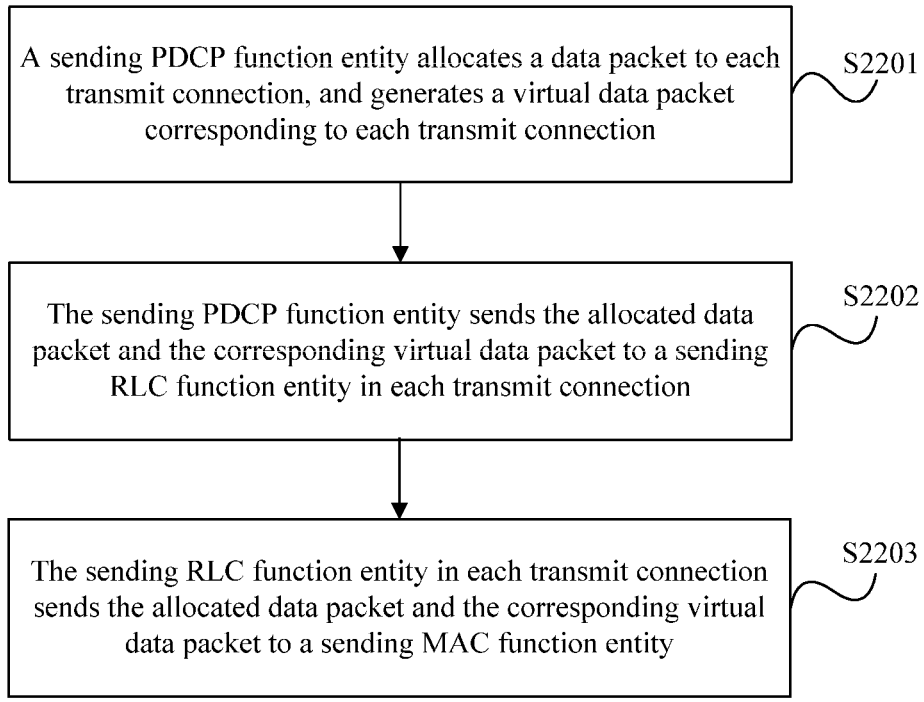
FIG. 22 is a schematic flowchart of still another data packet transmission method according to the disclosure.

FIG. 22 is a schematic flowchart of still another data packet transmission method according to the disclosure. A difference between an embodiment shown in FIG. 22 and the embodiment shown in FIG. 21 lies in: In the embodiment shown in FIG. 21, the sending RLC function entity generates the virtual data packet; and in the embodiment shown in FIG. 22, a sending PDCP function entity generates a virtual data packet. The method in this embodiment is as follows:

Operation S2201: A sending PDCP function entity allocates a data packet to each transmit connection, and generates a virtual data packet corresponding to each connection.

The virtual data packet includes a PDCP packet header and does not include data.

Operation S2202: The sending PDCP function entity sends the allocated data packet and the corresponding virtual data packet to a sending RLC function entity in each transmit connection.

Data packets sent through one transmit connection are a data packet 1, a data packet 2, a data packet 3 (a virtual data packet), a data packet 4 (a virtual data packet), a data packet 5 (a virtual data packet), a data packet 6, and a data packet 7.

Data packets sent through another transmit connection are the data packet 1 (a virtual data packet), the data packet 2 (a virtual data packet), the data packet 3 (a virtual data packet), the data packet 4, the data packet 5, the data packet 6, and the data packet 7 (a virtual data packet).

Operation S2203: The sending RLC function entity in each transmit connection sends the allocated data packet and the corresponding virtual data packet to a sending MAC function entity.

In this embodiment, the sending PDCP function entity allocates the data packet to each transmit connection, and generates the virtual data packet corresponding to each transmit connection; and sends the allocated data packet and the corresponding virtual data packet to the sending RLC function entity in each transmit connection, so that data packets sent through each transmit connection include data packets of all serial numbers. In this way, a receiving RLC function entity can directly determine, based on a serial number of a data packet, whether to request data packet retransmission.

In the multi-connectivity scenario shown in FIG. 17, the disclosure further provides a data packet retransmission method. Indication information is added to a packet header of a first RLC PDU following an SN gap. The indication information is used to indicate that the data packet is a first data packet following the SN gap and is of a Boolean type. A receiving RLC function entity moves a window based on the indication information. In one embodiment, the indication information may further include a quantity of data packets in the SN gap. In one embodiment, the indication information may further include an identifier of a last data packet preceding the SN gap. Further, the receiving RLC function entity may learn of whether an unreceived data packet is received through another receive connection or fails to be transmitted, and determine whether to request retransmission of the unreceived data packet. In one embodiment, the indication information may be alternatively sent by using a separate RLC protocol data unit. This is not limited in the disclosure.

Figure 23:
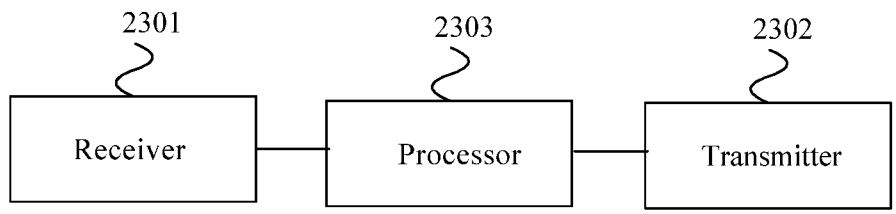
FIG. 23 is a schematic structural diagram of a segment retransmission apparatus according to the disclosure.

FIG. 23 is a schematic structural diagram of a segment retransmission apparatus according to the disclosure. The apparatus in this embodiment includes a receiver 2301 and a transmitter 2302. The receiver 2301 is configured to receive segments of a data packet identified by a first serial number; and the transmitter 2302 is configured to: if the receiver has not received, within a preset time period, all the segments of the data packet identified by the first serial number, send a retransmission request to a sending party, where the retransmission request includes the first serial number, and the retransmission request is used to request to retransmit an unreceived segment of the data packet identified by the first serial number.

In FIG. 23, further, the apparatus further includes a processor 2303. The processor 2303 is configured to: start a first timer after the receiver receives a first radio link control (RLC) protocol data unit (PDU) in the data packet identified by the first serial number, where timing duration of the first timer is the preset time period; and if the first timer expires, determine that not all the segments of the data packet identified by the first serial number are received.

In the foregoing embodiment, the processor 2303 is further configured to determine that the received first RLC PDU is the first segment of the data packet identified by the first serial number.

In the foregoing embodiment, the processor 2303 is specifically configured to: obtain the first serial number of the first RLC PDU after the receiver receives the first RLC PDU; and determine, based on the first serial number of the first RLC PDU, whether a segment having the same first serial number exists in a cache, and if no segment having the same first serial number exists, determine that the first RLC PDU is the first segment corresponding to the first serial number.

In the foregoing embodiment, the processor 2303 is specifically configured to obtain the first serial number from a header of the first RLC PDU, where the header of the first RLC PDU includes the first serial number; or the receiver 2301 receives a notification message from a receiving media access control function entity, where the notification message includes the first serial number.

In the foregoing embodiment, the processor 2303 is further configured to determine that a type of the first RLC PDU is a segment.

In the foregoing embodiment, the processor 2303 is specifically configured to determine, based on content in the header of the first RLC PDU, that the type of the first RLC PDU is the segment; or the processor is specifically configured to determine, based on content in a header of a media access control service data unit MAC SDU corresponding to the first RLC PDU of a receiving party, that the type of the first RLC PDU is the segment.

In the foregoing embodiment, the header of the first RLC PDU includes a serial number, or the header of the first RLC PDU includes a serial number and a segment offset (SO); and the processor 2303 is specifically configured to: if the header of the first RLC PDU includes the serial number and the SO, determine that the type of the first RLC PDU is the segment.

In the foregoing embodiment, the processor 2303 is further configured to: determine that a type of the first RLC PDU is a data packet; and determine whether a segment corresponding to the data packet exists in the cache, and if a segment corresponding to the data packet exists, delete the segment corresponding to the data packet.

In the foregoing embodiment, the retransmission request includes the first serial number and an identifier of an unreceived segment of the data packet identified by the first serial number.

In the foregoing embodiment, the retransmission request further includes a second serial number and an identifier of an unreceived segment of a data packet identified by the second serial number.

In the foregoing embodiment, the identifier of the segment includes a start location of the segment and an offset of the segment.

The apparatus in the embodiment shown in FIG. 23 may be correspondingly configured to perform the technical solution in the method embodiment shown in FIG. 7. Implementation principles and technical effects thereof are similar, and are not described herein again.

Figure 24:
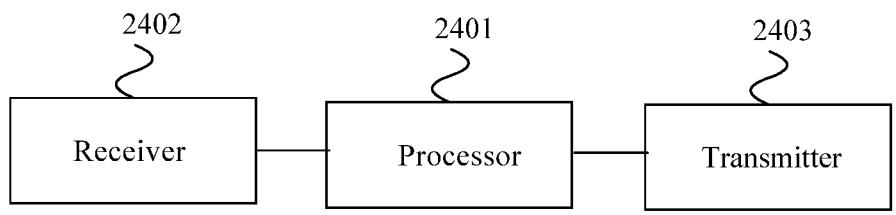
FIG. 24 is a schematic structural diagram of another segment retransmission apparatus according to the disclosure.

FIG. 24 is a schematic structural diagram of another segment retransmission apparatus according to the disclosure. The apparatus in this embodiment includes a processor 2401, a receiver 2402, and transmitter 2403.

The processor 2401 is configured to: after segmenting a data packet, start a first timer corresponding to the data packet.

The receiver 2402 receives a retransmission request from a receiving radio link control function entity.

The transmitter 2403 is configured to: if the receiver 2402 receives the retransmission request from the receiving radio link control function entity before the first timer expires, perform retransmission according to the retransmission request.

In the foregoing embodiment, the transmitter 2403 is further configured to: if the first timer expires, retransmit the data packet corresponding to the first timer.

In the foregoing embodiment, the processor 2401 is further configured to: if the receiver 2402 receives, from the receiving radio link control function entity, a notification that the data packet corresponding to the first timer has been received or all segments of the data packet have been received, stop the first timer; or the processor 2401 is further configured to: if the receiver 2402 receives, from a receiving packet data convergence protocol function entity, a notification that the data packet corresponding to the first timer has been received, stop the first timer; or the processor 2401 is further configured to: if the receiver 2402 receives, from a sending packet data convergence protocol function entity, a notification that the data packet corresponding to the first timer has been received, stop the first timer; or the processor 2401 is further configured to: if the receiver 2402 receives acknowledgements (ACKs) corresponding to hybrid automatic repeat request (HARQ) processes used for sending all segments of the data packet corresponding to the first timer, stop the first timer.

The apparatus in the foregoing embodiment may be correspondingly configured to perform the technical solution in the method embodiment shown in FIG. 12. Implementation principles and technical effects thereof are similar, and are not described herein again.

Based on the embodiment shown in FIG. 24, the transmitter 2403 is further configured to: if the first timer expires, send a status report reporting request to the receiving radio link control function entity, where the status report reporting request includes a serial number of the data packet corresponding to the first timer;

the receiver 2402 is further configured to receive a radio link control (RLC) status report sent by the receiving radio link control function entity; and the processor 2401 is further configured to control, based on the RLC status report, the transmitter to retransmit the data packet or a segment corresponding to the first timer.

In the foregoing embodiment, the RLC status report includes receiving status information of at least one data packet;

the at least one data packet includes the data packet corresponding to the first timer; and receiving status information of each data packet includes:
a serial number of a data packet corresponding to all segments that have been received; or
a serial number of a data packet corresponding to any segment that is not received; or
a serial number of a data packet corresponding to some segments that are received, and identifiers of the some segments, where the identifiers of the some segments include start locations of the segments and offsets of the segments.

The apparatus in the foregoing embodiment may be correspondingly configured to perform the technical solution in the method embodiment shown in FIG. 14. Implementation principles and technical effects thereof are similar, and are not described herein again.

A person of ordinary skill in the art may understand that all or some of the operations of the method embodiments may be implemented by a program by instructing relevant hardware. The program may be stored in a computer readable storage medium. When the program runs, the operations of the method embodiments are performed. The storage medium includes various media that can store program code, such as a ROM, a RAM, a magnetic disk, or an optical disc.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A segment retransmission method, comprising:
   receiving, by a receiving radio link control (RLC) function entity, a first RLC protocol data unit (PDU) of a data packet from a sending RLC function entity;
   determining that the first RLC PDU is a first segment of the data packet;
   in response to determining that the first RLC PDU is the first segment of the data packet, starting, by the receiving RLC function entity, a first timer;
   determining, by the receiving RLC function entity, that it has not received all segments of the data packet when the first timer expires;
   sending, by the receiving RLC function entity, a retransmission request to the sending RLC function entity, wherein the retransmission request comprises a first serial number, and is used to request to retransmit an unreceived segment of the data packet.

2. The method according to claim 1, wherein
   the determining, by the receiving RLC function entity, that the received first RLC PDU is the first segment of the data packet comprises:
   receiving, by the receiving RLC function entity, the first RLC PDU, and obtaining the first serial number of the first RLC PDU; and
   determining, by the receiving RLC function entity based on the first serial number of the first RLC PDU, whether a segment having the same first serial number exists in a cache, and when no segment having the same first serial number exists in the cache, determining that the first RLC PDU is the first segment corresponding to the first serial number.

3. The method according to claim 2, wherein the obtaining the first serial number of the first RLC PDU comprises:
   obtaining, by the receiving RLC function entity, the first serial number from a header of the first RLC PDU, wherein the header of the first RLC PDU comprises the first serial number; or
   receiving, by the receiving RLC function entity, a notification message from a receiving media access control (MAC) function entity, wherein the notification message comprises the first serial number.

4. The method according to claim 2, further comprising:
   determining, by the receiving RLC function entity, that a type of the first RLC PDU is a segment.

5. The method according to claim 4, wherein the determining, by the receiving RLC function entity, that a type of the first RLC PDU is a segment comprises:
   determining, by the receiving RLC function entity based on content in the header of the first RLC PDU, that the type of the first RLC PDU is the segment; or
   determining, by the receiving RLC function entity based on content in a header of a media access control (MAC)

service data unit (SDU) corresponding to the first RLC PDU, that the type of the first RLC PDU is the segment.

6. The method according to claim 5, wherein the header of the first RLC PDU comprises a serial number, or the header of the first RLC PDU comprises a serial number and a segment offset (SO); and the determining, by the receiving RLC function entity based on content in the header of the first RLC PDU, that the type of the first RLC PDU is the segment comprises:

when the header of the first RLC PDU comprises the serial number and the SO, determining that the type of the first RLC PDU is the segment.

7. The method according to claim 2, further comprising: determining, by the receiving RLC function entity, that a type of the first RLC PDU is a data packet; and determining, by the receiving media access control (MAC) function entity, whether a segment corresponding to the data packet exists in the cache, and when a segment corresponding to the data packet exists, deleting the segment corresponding to the data packet.

8. The method according to claim 1, wherein the retransmission request comprises the first serial number and an identifier of the unreceived segment of the data packet identified by the first serial number.

9. The method according to claim 8, wherein the retransmission request further comprises a second serial number and an identifier of an unreceived segment of a data packet identified by the second serial number.

10. The method according to claim 8, wherein the identifier of the segment comprises a start location of the segment and an offset of the segment.

11. A segment retransmission apparatus, comprising:
a memory storing instructions; and
a processor in communication with the memory, wherein the processor executes the instructions to:
receive a first radio link control (RLC) protocol data unit (PDU) of a data packet from a sending RLC function entity,
determining that the first RLC PDU is a first segment of the data packet,
in response to determining that the first RLC PDU is the first segment of the data packet, starting, by the receiving RLC function entity, a first timer,
determine that if the processor has not received, within a preset time period, all segments of the data packet when the first timer expires,
send a retransmission request to a sending RLC function entity, wherein the retransmission request comprises a first serial number, and is used to request to retransmit an unreceived segment of the data packet.

12. The apparatus according to claim 11, wherein the processor executes the instructions to:
obtain the first serial number of the first RLC PDU after receiving the first RLC PDU; and
determine, based on the first serial number of the first RLC PDU, whether a segment having the same first serial number exists in a cache, and when no segment having the same first serial number exists in the cache, determine that the first RLC PDU is the first segment corresponding to the first serial number.

13. The apparatus according to claim 12, wherein the processor executes the instructions to:
obtain the first serial number from a header of the first RLC PDU, wherein the header of the first RLC PDU comprises the first serial number; or
receive a notification message from a receiving media access control (MAC) function entity, wherein the notification message comprises the first serial number.

14. The apparatus according to claim 11, wherein the processor executes the instructions to: determine that a type of the first RLC PDU is a segment.

15. The apparatus according to claim 11, wherein the header of the first RLC PDU comprises a serial number, or the header of the first RLC PDU comprises a serial number and a segment offset (SO).

16. The apparatus according to claim 12, wherein the processor executes the instructions to:
determine that a type of the first RLC PDU is a data packet; and
determine whether a segment corresponding to the data packet exists in the cache, and when a segment corresponding to the data packet exists, delete the segment corresponding to the data packet.

17. The apparatus according to claim 11, wherein the retransmission request comprises the first serial number and an identifier of the unreceived segment of the data packet identified by the first serial number.

18. The apparatus according to claim 17, wherein the retransmission request further comprises a second serial number and an identifier of an unreceived segment of a data packet identified by the second serial number.

19. The apparatus according to claim 17, wherein the identifier of the segment comprises a start location of the segment and an offset of the segment.

* * * * *